United States Patent [19]

McClain

[11] 4,440,908

[45] Apr. 3, 1984

[54] FINELY DIVIDED IONOMER COATED THERMOPLASTIC RESIN

[75] Inventor: Dorothee M. McClain, Cincinnati, Ohio

[73] Assignee: National Distillers and Chemical Corporation, New York, N.Y.

[21] Appl. No.: 299,912

[22] Filed: Sep. 8, 1981

Related U.S. Application Data

[62] Division of Ser. No. 205,838, Nov. 10, 1980, Pat. No. 4,336,210.

[51] Int. Cl.$^3$ .................. C08L 33/02; C08L 23/04; C08L 23/26; C08J 3/12
[52] U.S. Cl. .................................. 525/196; 525/221; 525/902; 428/407
[58] Field of Search ............... 525/196, 221, 274, 902; 428/407

[56] References Cited

U.S. PATENT DOCUMENTS

| | | | |
|---|---|---|---|
| 3,347,957 | 10/1967 | Adomaitis et al. ................. | 525/221 |
| 3,365,520 | 1/1968 | Foster et al. ......................... | 525/221 |
| 3,437,718 | 4/1969 | Rees .................................... | 525/221 |
| 3,628,993 | 12/1971 | Gilbert et al. ....................... | 428/407 |
| 4,174,335 | 11/1979 | Ohdaira et al. ............. | 260/29.6 RW |
| 4,258,001 | 3/1981 | Pierce et al. ....................... | 428/407 |
| 4,280,923 | 7/1981 | Small et al. ........................ | 428/407 |

*Primary Examiner*—Carman J. Seccuro
*Attorney, Agent, or Firm*—Kenneth D. Tremain

[57] ABSTRACT

Powders of thermoplastic resins such as polyethylene homopolymer and ethylene-vinyl acetate copolymer are obtained by agitating molten resin in admixture with water and in the presence of a dispersing amount of a substantially water insoluble ionomer polymer.

16 Claims, No Drawings

FINELY DIVIDED IONOMER COATED THERMOPLASTIC RESIN

This is a division of application Ser. No. 205,838, filed Nov. 10, 1980, now U.S. Pat. No. 4,336,210.

BACKGROUND OF THE INVENTION

1. Field of the Invention

This invention belongs to the field of processes for providing thermoplastic resins in fine powder form and, more particularly, to such processes in which the powders are obtained from aqueous dispersions of resin.

2. Description of the Prior Art

Thermoplastic resins in finely-divided form have found use in a number of applications where it is either impossible or inconvenient to utilize the more conventional cube or pellet forms. For example, powdered organic polymeric thermoplastic resins in dry form have been used to coat articles by dip coating in either a static or fluidized bed, by powder coating wherein the powder is applied by spraying or dusting, and by flame spraying. In dispersed form, thermoplastic resin powders have been applied as coatings by roller coating, spray coating, slush coating, and dip coating to substrates such as metal, paper, paperboard, and the like. These powders have also been widely employed in conventional powder molding techniques. Other applications of these powders include paper pulp additives; mold release agents for rubber; additives to waxes, paints, and polishes; binders for non-woven fabrics; dry-blendable impact modifier powders; and so on.

It is well known that high molecular weight thermoplastic resins, for example, polyethylene and ethylene copolymers, may be converted to dispersions of spherically shaped particles which are substantially devoid of particles greater than 25 microns in diameter and in which the number average particle diameter is less than about 10 microns. Thus, McClain, U.S. Pat. No. 3,422,049, teaches that such dispersions of finely divided particles may readily be prepared by agitating the molten resin in admixture with water at elevated temperatures and at autogeneous pressure, in the presence of certain dispersing agents which are particular block copolymers of ethylene oxide and propylene oxide. Such dispersing agents are available commercially under the trade name Pluronic (BASF-Wyandotte Corp.). Unless the thermoplastic resin is a soft, tacky material that is prone to coalesce under ambient conditions, the nonagglomerated spherical particles can be recovered as powders by cooling the dispersions below about 100° C. and collecting the suspended material by filtration or centrifugation.

U.S. Pat. No. 3,418,265 teaches that the particle size of such thermoplastic resin dispersions can be reduced still further, to the submicron level, while retaining the unique spherical particle shape by including in the dispersion process a volatile, inert, water-insoluble organic liquid that is soluble in the thermoplastic resin in an amount between 0.5 to 20 parts per 100 parts of the resin, whereupon a stable, aqueous, film-forming latex is ultimately obtained as the final product. Alternatively, U.S. Pat. No. 3,522,036 teaches that stable, film-forming aqueous latices of high molecular weight polyethylene can also be formed by including a liquid vinyl monomer such as styrene in the dispersion process.

Although the foregoing dispersion procedures are conveniently operated as batch processes, it is also known to produce such finely divided powders in a sequential, continuous process. See, e.g., U.S. Pat. No. 3,432,483.

U.S. Pat. No. 3,586,654 teaches that it is further possible to conduct the dispersion process in such a way that the polymer particles may be further transformed into spherical particles of controlled average size and size distributions which are the same, larger or smaller than the starting particles. If desired, the dispersion process can be modified in such a manner as to produce spherical foamed particles (U.S. Pat. No. 3,472,801), or to incorporate within the particles certain colorants (U.S. Pat. No. 3,449,291) and pigments (U.S. Pat. No. 3,674,736). In addition, it has been found that various substrates can be coated by applying the above described dispersions of polyolefin fine powders in an inert carrier, heating to evaporate the carrier, and fusing the polyolefin to the substrate (U.S. Pat. No. 3,432,339). Further, U.S. Pat. No. 3,669,922 teaches a process for preparing colored polymer powders having controlled charge and printing characteristics of value as toners in electrostatic printing.

In the above cited art, the dispersing agents, as block copolymers of ethylene oxide and propylene oxide with molecular weights of about 3,500 to as much as 16,250, belong to the class of oligomeric or low molecular weight polymeric dispersing agents, as opposed to the more familiar, conventional dispersing agents such as, for example, fatty acid soaps, sodium lauryl sulfate, etc. For many years it appeared that the aforesaid block copolymers of ethylene oxide and propylene oxide were the only substances capable of directly dispersing high molecular weight thermoplastic resins, especially olefin polymers, in water at elevated temperatures.

Recently, however, it has been shown that certain soaps of the highest acids available commercially, e.g., lithium behenate, are by themselves also capable of dispersing polyethylene (U.S. Pat. No. 4,148,768). Alkali metal soaps of fatty acids such as stearic acid, oleic acid, palmitic acid, myristic acid, etc. are at best only marginally effective in dispersing polyethylene and are quite ineffective in producing polyethylene dispersions at the high resin concentrations and high production rates attainable with the ethylene oxide-propylene oxide copolymer dispersants disclosed above. The alkali metal soaps of the said fatty acids can, however, be made to disperse polyethylene and ethylene-vinyl acetate copolymers containing up to about 15 weight percent of vinyl acetate, at rates and at solids levels comparable to those achievable wit the Pluronics, if said soaps are produced from the fatty acid and alkali in situ during the dispersion process and in the presence of a water-soluble neutral salt; e.g., sodium chloride, sodium sulfate (U.S. Pat. No. 4,148,766). When ethylene-vinyl acetate copolymers containing about 15 to 35 weight percent of vinyl acetate are dispersed, however, a preformed alkali metal fatty acid soap, in the presence of a water-soluble neutral salt, may then be used as the dispersant system (U.S. Pat. No. 4,151,133), and if the ethylene-vinyl acetate copolymer contains above about 35 weight percent of vinyl acetate, the soap alone is a satisfactory dispersing agent, optionally in the presence of a water-soluble neutral salt to control particle size (U.S. Pat. No. 4,150,003).

As pointed out above, block copolymers of ethylene oxide and propylene oxide as dispersants produce spherical particles with a number average particle diameter less than about 10 microns. In general, particle diameter is affected very little by process variables. By contrast, however, the aforesaid newly described soap-salt dispersant systems produce larger spherical particles, with few particles having diameters below 20 microns being observed. Particle size in the soap-salt dispersion system can be varied to some degree by varying the nature of the soap and especially the concentration of the water-soluble neutral salt. Increasing the soap concentration beyond some threshold value has little effect on particle size. Adding alkali beyond the point of neutralization of the fatty acid favors binodal particle size distributions.

Truly high molecular weight dispersing agents have recently been employed to disperse olefinic polymers (U.S. Pat. No. 4,174,335), but the process of that patent is clearly directed to the production of stable aqueous dispersions, and not to the dispersion of such resins into particle size ranges that would lend themselves to recovery as dry powders. Thus, according to U.S. Pat. No. 4,174,335, stable aqueous dispersions are produced by mixing a molten blend of (a) a carboxyl-free olefin resin and (b) a carboxyl-containing olefin resin with an aqueous medium in the presence of at least 0.2 chemical equivalent, to the carboxyl groups, of a base. Typically, aqueous dispersions stable up to seven days at room temperature are produced, the ultrafine particles of which are spherical and no more than 3 microns in diameter. Larger particles were obtained only when the process was operated at too low a dispersion temperature (120° C.) or when less than 0.2 equivalent of base per equivalent carboxyl groups was used, or when the acid number of the carboxyl-contaning olefin resin was less than 20. As explained more fully hereinafter, the process of U.S. Pat. No. 4,174,335 is totally unsuited to making olefin polymer powders of the previously cited art, and especially of the present invention, because the rates of dispersion are exceedingly slow. Moreover, the ultrafine particles produced are too fine for easy isolation, handling and application.

SUMMARY OF THE INVENTION

In accordance with this invention, a normally solid thermoplastic resin is rapidly dispersed under conditions of rapid mixing in water heated to a temperature at or above the melting point of the resin, employing as dispersing agent at least one substantially water-insoluble ionomer polymer, and following cooling of the aqueous dispersion to a temperature which is below about 100° C., the resin is recovered therefrom as a finely divided powder. The use of substantially water-insoluble ionomer polymers as dispersing agents herein generally provides resin particles which are larger than those obtained by the use of the block copolymers of ethylene oxide and propylene oxide heretofore employed as dispersing agents, and more comparable in size to those produced by the aforesaid soap-salt dispersant systems, while at the same time affording a wider choice of process variables for controlling particle size and particle size distribution than is possible with the latter dispersants without, however, requiring the use of large amounts of dispersant. In addition, the dispersing agents herein substantially avoid the objectionable respirable dusts (air-borne particles 10 microns or less in diameter) that can at times be created from powders produced by the aforementioned block copolymers of ethylene oxide and propylene oxide.

Briefly stated, the invention herein provides a process for preparing in finely divided form a solid organic polymeric thermoplastic resin which comprises: (a) agitating a mixture of the resin while in the molten state, a dispersion-forming amount of water, and a dispersion-forming amount of a substantially water-insoluble ionomer polymer, to provide an aqueous dispersion of the resin; and, (b) cooling the dispersion to below about 100° C. to provide solid particles of resin.

The cooled dispersion of resin powder can be directly employed in various applications or the resin powder can be recovered therefrom using known and conventional procedures such as filtration and centrifugation.

The term "ionomer polymer" as used herein defines an ionic copolymer of at least 50 mol percent of an ethylenically unsaturated alpha-olefin of 2 to 10 carbon atoms, from about 0.2 to about 50 mol percent of an alpha, beta-ethylenically unsaturated carboxylic acid having from 3 to 8 carbon atoms, and optionally, other ethylenically unsaturate comonomers, said copolymers having from 10% to 100% of the carboxylic acid groups in salt form with metal ions. The foregoing copolymers and methods for their preparation are now well-known, e.g., as disclosed in U.S. Pat. Nos. 3,264,272 and 3,322,734, both of which are incorporated by reference herein, and various types are commercially available from E. I. DuPont de Nemours and Company as the Surlyn ionomer resins.

Functional derivatives of the alpha, beta-ethylenically unsaturated carboxylic acid copolymer resins, e.g., their lower alkyl esters, their amides, imides, may also be converted to the ionomer polymers as defined herein, by known processes of partial or complete saponification or hydrolysis.

The ionomer may be produced in situ during the dispersion process, from a copolymer of an alpha-olefin and an alpha, beta-unsaturated carboxylic acid and an alkali added to the aqueous dispersion medium. Exemplary thereof is the use of ethylene-acrylic acid copolymers in the presence of an aqueous dispersion medium containing sodium hydroxide. Such ethylene-acrylic acid copolymers are available, for example, from Dow Chemical Co.

DESCRIPTION OF THE PREFERRED EMBODIMENTS

In general, the polymers suitable for the practice of this invention include any normally solid synthetic organic polymeric thermoplastic resin whose decomposition point is somewhat higher than its melting point and somewhat less than the critical temperature of water. Included are polyolefins, vinyls, olefin-vinyl copolymers, olefinallyl copolymers, polyamides, acrylics, polystyrenes, cellulosics, polyesters and fluorocarbons.

The polyolefins most suitable for the practice of this invention include normally solid polymers of olefins, particularly mono-alpha olefins, which comprise from two to about six carbon atoms, e.g., polyethylene, polypropylene, polybutene, polyisobutylene, poly(4-methylpentene), and the like. Preferred polyolefin feeds are polyethylene and polypropylene.

Vinyl polymers suitable for use in this invention include polyvinyl chloride, polyvinyl fluoride, vinyl chloride/vinyl acetate copolymers, and polyvinylidene dichloride and difluoride.

Suitable olefin-vinyl copolymers include ethylene-vinyl acetate, ethylene-vinyl propionate, ethylene-vinyl isobutyrate, ethylene-vinyl alcohol, ethylene-methyl acrylate, and ethylene-ethyl methacrylate. Especially preferred are ethylene-vinyl acetate copolymers wherein the ethylene constitutes at least about 25%, preferably at least about 50%, of the copolymer by weight.

Olefin-allyl copolymers include ethylene-allyl alcohol, ethylene-allyl acetate, ethylene-allyl ether, ethylene-acrolein, and the like. Ethylene-allyl alcohol is especially preferred.

Preferred among the polyamides are linear superpolyamide resins, commonly referred to as nylons. Such polymers can be made by the intermolecular condensation of linear diamines containing from 6 to 10 carbon atoms with linear dicarboxylic acids containing from 2 to 10 carbon atoms. Equally well, the superpolyamides may be made from amide-forming derivatives of these monomers such as esters, acid chlorides, amine salts, etc. Also suitable are superpolyamides made by the intramolecular polymerization of omega-amino-acids containing 4 to 12 carbon atoms and of their amide-forming derivatives, particularly the lactams. Examples of specific nylons are polyhexamethylene adipamide, polyhexamethylene sebacamide, and polycaprolactam. Especially preferred ar nylons having intrinsic viscosities ranging between 0.3 to 3.5 dl./g. determined in m-cresol.

Acrylic resins suitable for use in this invention include polymethyl methacrylate, polyacrylonitrile, polymethyl acrylate, polyethyl methacrylate, etc. Preferred is polymethyl methacrylate.

The ionomer polymer dispersing agents of this invention are anionic, substantially water-insoluble random (but occasionally alternating or block) copolymers having an average molecular weight of about 10,000 to about 1,000,000 or even higher, and preferably, from about 10,000 to 300,000. The resins herein can be obtained by copolymerizing a first ethylenically unsaturated compound selected from the group consisting of mono-olefins and diolefins of from 2 to 10 carbon atoms, vinyl aromatics, vinyl esters and vinyl ethers, and a second olefinically unsaturated compound selected from the group consisting of an alpha, beta-ethylenically unsaturated carboxylic acid or alpha, beta-ethylenically unsaturated sulfonic acid of from 3 to 8 carbon atoms to provide a copolymer containing at least 50 mol percent polymerized of the first ethylenically unsaturated compound and from 0.2 to 50 mol percent polymerized alpha, beta-ethylenically unsaturated carboxylic or sulfonic acid and thereafter reacting the copolymers with an ionizable metal compound which results in the formation of the ionomer. Alternatively, the resins herein can be prepared by graft copolymerizing from about 3 to about 30 weight percent, and preferably from about 5 to about 15 weight percent, of an alpha, beta-ethylenically unsaturated carboxylic or sulfonic acid onto an ethylenic homopolymer or copolymer and reacting the resulting resins with ionizable metal compounds. Where the sulfonic acid-containing base resins are concerned, another procedure for preparing the dispersants herein involves introducing in a known manner sulfonic acid groups into an ethylenic unsaturated homopolymer or copolymer and reacting the sulfonated resins with an ionizable metal compound.

Monoolefins which can be employed in the formation of the ionomer polymers include ethylene, propylene, butene-1, pentene-1, hexene-1, 3-methylbutene-1, 4-methylpentene-1, and so on. Diolefins which can be used herein include butadiene, isoprene, 2,3-dimethylbutadine, 2-chlorobutadiene, 2-fluorobutadiene, and the like. Useful vinyl aromatics include styrene, alpha-methyl styrene, vinyl toluene and vinyl naphthalene. Among the vinyl esters which can be used to prepare the ionomer resins are vinyl acetate, vinyl propionate, vinyl butyrate, vinyl trimethylacetate, vinyl pelargonate, vinyl decanoate, vinyl laurate, vinyl palmitate, and vinyl stearate. Useful vinyl ether monomers include methyl vinyl ether, ethyl vinyl ether, isopropyl vinyl ether, n-butyl vinyl ether, n-hexyl vinyl ether, n-octyl vinyl ether, and the like.

Among the alpha, beta-ethylenically unsaturated carboxylic acids which can be reacted with the monoolefins, diolefins, vinyl esters and vinyl ethers above-cited, to form the copolymers for conversion to the ionomeric polymer dispersing agents of this invention, are acrylic acid, methacrylic acid, ethacrylic acid, itaconic acid, maleic acid, fumaric acid, monoesters of dicarboxylic acids such as methyl hydrogen maleate, methyl hydrogen fumarate and ethyl hydrogen fumarate and the chemically equivalent acid anhydrides such as maleic anhydride. Vinyl sulfonic acid can be copolymerized with ethylenically unsaturated monomer (s) to provide the copolymer resins herein; alternatively, sulfonic acid groups can be introduced into an unsaturated polymer or copolymer by reacting the latter with acetyl sulfate, or a sulfur trioxide complex of dioxane or tetrahydrofuran or by using any other known sulfonation technique.

Metal ions which are advantageously employed in the formation of the ionomeric copolymers can be selected from among the uncomplexed and complexed ions as described in U.S. Pat. No. 3,264,272 which is incorporated herein by reference for the disclosure of suitable metal ions. Examples of useful uncomplexed metal ions are the mono-, di- and trivalent ions of the metals of Groups I, II, III, IV-A and VIII of the Periodic Table of the Elements. Suitable monovalent metal ions are those of sodium, potassium, lithium, cesium, silver, mercury and copper. Suitable divalent metal ions are those of beryllium, magnesium, calcium, strontium, barium, copper, cadmium, mercury, tin, lead, iron, cobalt, nickel and zinc. Suitable trivalent metal ions are those of aluminum, chromium, iron and yttrium. Alkali metal ions are preferred. The ionomer-producing reaction is conveniently carried out by blending the carboxylic or sulfonic acid copolymers with a sufficient amount of metal compound calculated to result in neutralization of at least 10 percent of the acid groups present in the copolymer chain and separating the resulting ionomeric copolymers. The carboxylic or sulfonic acid-containing copolymer and the metal compound for converting it to the ionomeric form may be blended in a separate operation, as in a Banbury mill; in an extruder, especially in a multi-screw extruder; in a continuous mixer, or on a two-roll rubber mill. If desired, the blending may be done in a separate dispersion operation, wherein the carboxylic or sulfonic acid-containing copolymer, or a functional derivative thereof, e.g., a lower alkyl ester, amide or imide, is fed to an aqueous solution of alkali, sufficient for neutralization or saponification, to yield an aqueous dispersion of the desired ionomeric dispersant. The aqueous dispersion of ionomeric polymer thus produced can thereafter be fed as a separate stream to provide the polymeric dispersant for dispersing thermoplastic resins according to the process of this invention.

Alternatively, the carboxylic or sulfonic acid-containing copolymer for producing the ionomer dispersing resin may be fed directly to the dispersion vessel, separate from the thermoplastic resin to be dispersed, or it may be blended or mixed with the thermoplastic resin and then fed to the dispersion reactor, where, in either case, sufficient alkali is present to at least effect a 10 to 100% neutralization of the acid groups present.

When the degree of neutralization is increased, the particle size distribution generally becomes narrower. For ionomer dispersing resins of higher initial carboxylic acid content, particle size shifts to finer particle sizes. For dispersing resins of lower carboxylic acid content, narrowing of particle size tends to occur at larger particle sizes. Thus, degree of neutralization provides a means of controlling particle size.

The ionomer polymer dispersing agents of the present invention, by functioning effectively from temperatures as low as the melting point of low density polyethylene, i.e., about 115° C., up to as high as 325° C. are not limited to the dispersion of low molecular weight low density polyethylenes. For example, high molecular weight, low density polyethylenes; linear polyethylene; polypropylene, polyvinyl chloride, ethylene-vinyl acetate copolymers; ethylene-allyl alcohol copolymers; nylon; and the like, can be readily dispersed by means of the subject novel dispersing agents to dispersions substantially devoid of particles larger than 800 microns and wherein the particle size can be controlled to have a relatively narrow particle size range.

The temperature of operation is dependent upon the melting point, melt flow properties, decompostion temperature, and desired particle size and particle size distribution of the selected synthetic organic thermoplastic resin and ionomer polymer dispersing agent. While the foregoing can be dispersed at temperatures commencing with their respective melting point, increases in dispersion temperature beyond the melting point and up to the decomposition of the resins are generally accompanied by corresponding increases in the fluidity of the molten resin. As the fluidity of the melt increases, the dispersions generally tend to develop lower average particle sizes without requiring increases in agitation effort.

The dispersing apparatus or device may be any device capable of delivering at least a moderate amount of shearing action under elevated temperatures and pressures to a liquid mixture. Suitable, for example, are conventional autoclaves equipped with conventional propeller stirrers. Propellers designed to impart greater shear to the mixture, e.g., toothed disc impellers can also be employed. The particle size and distribution are dependent on the stirring rate, high stirring speeds resulting in finer and narrower dispersions until an optimum speed is reached above which there is little change. In general, the rate of stirring can vary from about 1200 to about 4000 rpm and preferably from about 1800 to about 3800 rpm. Stirring rates lower than these can be sufficient for a particular dispersion medium and higher rates, while operable, are usually without advantage. The dispersion appears to be formed almost instantaneously, at the moment the stirrer is first started upon reaching dispersion temperature in batch operation, or when the resins enter the dispersion zone in continuous operation. Broadly, the stirring periods will range from about 1 to 20 minutes and preferably from about 5 to 15 minutes. The stirring period, or dispersion time as defined above, has relatively little effect on particle size when polyolefins are dispersed, but shifts in particle size may be observed when more polar polymers are dispersed. In the process of this invention, and in the aforesaid prior art involving the production of resin powders by dispersion in water wherein the dispersing agent is a block copolymer of ethylene oxide and propylene oxide, or a soap-salt system, as a consequence of the almost instantaneous nature of the dispersion process, the maximum solid level (25% or more) of dispersed resin is reached equally fast. This nearly instantaneous build-up to maximum solids may be contrasted with the process of U.S. Pat. No. 4,174,335 wherein comparable solids levels are reached only slowly, over periods of an hour or more, and where additional stirring periods are routinely employed. It will be understood, however, that the stirring rates and periods will depend upon the type of equipment utilized.

A very important characteristic, therefore, of the powder-making process of this invention and, in general, of all the above-cited powder-making art, is the rate at which the total olefin polymer or copolymer and ionomeric dispersing resin is converted to the dispersed finely-divided form. Broadly, the rate will range from at least 200 g. of total resin per liter of aqueous medium per 10 minutes to as much as 20,000 g. of resin per liter of aqueous medium per 10 minutes, preferably from about 400 g. to 1500 g. of total resin per liter of aqueous medium per 10 minutes. The highest possible rates are desirable if polymer powders are to be manufactured at lowest costs in a plant of any given size.

These high rates may be contrasted with the much lower rates of 1–100 g. of resin dispersed per liter of aqueous medium per 10 minutes disclosed in U.S. Pat. No. 4,174,335, wherein the final product is not a powder but a stable latex of ultrafine particles. Moreover, it is clear that in actual fact these rates of 1–100 g. must be scaled down still further to at most 0.25 to 25 g. of resin dispersed per liter of aqueous medium per 10 minutes because an additional stirring time of at least 30 minutes at temperature is specified in U.S. Pat. No. 4,174,335 after the completion of the period over which the resin is fed to the dispersion vessel. Therefore, the rates of the present powder-making process and of the above-cited related processes are at least ten times greater than those of U.S. Pat. No. 4,174,335.

In carrying out the subject process, the selected synthetic organic thermoplastic polymer is first contacted with water and the dispersing agent. It is a particularly advantageous feature of this invention that the dispersing agent need not be incorporated into the polymer prior to the introduction of the water by such means as melting and the like as in U.S. Pat. No. 4,174,335, but may be introduced into the dispersing apparatus simultaneously with the other ingredients or as a dispersion in the aqueous phase. Example 12 hereinbelow in fact shows that attempts to disperse pre-blended mixtures of low density polyethylene and a commercially available ionomer in the sodium form (Surlyn 1555) result in unacceptably coarse dispersions or in no dispersion at all. Alternatively, separate addition of the copolymer required for producing the ionomeric dispersing resin, e.g. an ethylene-acrylic acid copolymer, is also possible, but, in this method of operation, sufficient alkali must also be fed to convert, in situ during the dispersion process, said copolymer into the corresponding ionomeric dispersing resin. Separate feeding of the thermoplastic resin to be dispersed and the ionomeric dispersing resin, in one of the above-described operational variants, is generally to be preferred.

An outstanding advantage of such separate feeding of the two resins is that the ionomeric dispersing resin appears to accumulate on the surface of the dispersed particles of thermoplastic resin. This is evidenced by the fact that when the latter is a soft, tacky material such as an ethylene-vinyl acetate copolymer containing about 35 weight percent or more of vinyl acetate, a dispersed product is formed that can be recovered by filtration, dried and handled as a compaction-resistant dry powder. The dry powder is suitable for dry-blending into rigid polyvinyl chloride formulations where it functions as an impact strength improver. The same ethylene-vinyl acetate copolymers, when dispersed with the block copolymers of ethylene oxide and propylene oxide of the art, cannot even be recovered as discrete particles since the particles substantially coalesce upon filtration.

It is, of course, possible to blend the thermoplastic resin to be dispersed with the dispersing resin prior to the dispersion process, said procedure being an integral part of the comparatively slow process of U.S. Pat. No. 4,174,335 for making stable dispersions of ultrafine particles. The advantages of doing so, in the high rate process for making coarser powders of controlled particle size distribution of the present invention, are not impressive and can substantially be matched by suitable adjustment of one or more of the dispersion process variables when the resins are fed separately.

In particular, when in the process of the present invention, the preferred separate feeding of the two resins is replaced with the feeding of blends of the two resins, as is practiced in U.S. Pat. No. 4,174,335, there is no appearance of the ultrafine less-than-3 micron particles thereof. Rather, as shown in Examples 9 and 10 hereinbelow, using a partially neutralized ethylene-acrylic acid dispersing resin, blend feeding leads to only modest shifts to finer particle fractions, substantially all greater than 10 microns in diameter, and some narrowing of particle size distribution. And again, with a commercially-available ionomer resin (Surlyn 1555) richer in carboxylic acid content, separate feeding yields fine dispersions (Example 4), whereas blend feeding, as pointed out above, yields very coarse particles or no dispersion at all (Example 12). Addition of an alkali to the dispersion medium, however, which presumably augments the degree of neutralization of the said ionomer, will lead to dispersions where poor results were obtained without the added alkali (Example 13), but the particle sizes are still coarser in these blend-feeding experiments than when separate feeding was used, as in Example 4.

If desired, the dispersion process may be operated in a continuous manner, in which case it is convenient to continuously introduce the desired ratio of ionomeric dispersing agent, water, and thermoplastic resin in separate streams to the reactor while continuously removing from another part of the reactor the product dispersion.

The amount of water used in relation to the sum total of ionomeric dispersing resin and thermoplastic resin being dispersed generally ranges from about 0.1 to about 10.0 parts by weight of water per part of total normally solid resin. Lower ratios, although usable, present operational difficulties. The preferred range is between about 1.0 to about 5.0 parts per part of resin. The ratio of water to total resin solids has a strong effect on particle size and particle size distribution. Lowering the ratio toward unity can lead to a narrowing of particle size with a shift to finer particle sizes and in fact represents a parameter for controlling particle size and particle size distribution as is shown in Example 6 hereinbelow.

The amount of ionomer polymer dispersing agent should be sufficient to provide a dispersion of the resin in the water under the selected conditions. Very good dispersions can be obtained at amounts within the range of from 2 to about 50 weight parts by weight of dispersing agent per 100 weight parts by weight of thermoplastic resin and amounts of 5 to about 25 parts by weight are preferred. An increase in the ratio of ionomeric dispersing resin to the thermoplastic resin narrows particle size distribution. For ionomeric dispersing resins of higher carboxylic acid content, the narrowing of particle size will occur at finer particle sizes, other factors being equal, as shown in Examples 4, 7 and 8. Therefore, particle size and particle size distribution can be controlled to a considerable extent by varying the ratio of ionomer dispersing resin to the thermoplastic resin. There is no upper limit on the amount of dispersing agent which can be employed except that exceeding the amount beyond that required to provide an acceptable dispersion may be economically wasteful.

The temperature for forming the hot aqueous resin dispersion can range from about 100° C. to about 270° C. with temperatures of from about 150° C. to about 250° C. being preferred. Most preferred is a temperature of 200° C. to 250° C. Increasing the dispersion temperature from 200° C. to 250° C. can result in a narrowing of particle size distribution at intermediate particle size ranges for ethylene-vinyl acetate copolymers (Example 2). Thus, dispersion temperature is another parameter that can be used to control particle size and particle size distribution.

The pressure under which the present process is carried out is adjusted to exceed the vapor pressure of water at the operating temperature so as to maintain a liquid water phase. More particularly, the pressures may range from about 1 to 217 atmospheres, and preferably from about 6 to 120 atmospheres. In cases where the resin is sensitive to air at the elevated dispersion temperature, an inert gas, e.g., nitrogen or helium, may be substituted for the air normally present, and deaerated water used. When heat-sensitive polymers, e.g., polyvinyl chloride, are to be dispersed, heat stabilizers in sufficient amounts can be included in the dispersion process. Plasticizers, lubricants, antioxidants, and the like can also be included. Mixtures of polymers are also suitable for dispersion in accordance with the process of this invention.

The process of the present invention provides a method for rapidly converting thermoplastic resins to fine powders via dispersion in water. In rate of production it compares favorably with the previously mentioned process of U.S. Pat. No. 3,422,049 and the continuous process based thereon, described in U.S. Pat. No. 3,432,483, and also the processes of U.S. Pat. Nos. 4,168,768; 4,148,766; 4,151,133; and 4,150,003. It differs radically from the process of U.S. Pat. No. 4,174,335, which is directed to the production of stable aqueous dispersions of ultrafine particles, produced at much slower rates.

In the accompanying Tables A-1 and A-2, the process of this invention is contrasted with that of U.S. Pat. No. 4,174,335.

TABLE A-1

| Process of | Type | Density g/cc | Index g/10 Min. | Intrinsic Viscosity, [η] /1/ | Amount, g. /15/ | Type | Amount, g. /15/ | Intrinsic Viscosity, [η] /1/ | Acid No. | NaOH—COOH' Molar | Aqueous Medium ml. |
|---|---|---|---|---|---|---|---|---|---|---|---|
| U.S. Pat. No. 4,174,335 | | | | | | | | | | | |
| Example 2 | Ethylene-Butene-1 | 0.940 | /4/ | 1.0 | 20,500 (142.5) | Ethylene-Acrylic Acid Copolymer | 1,500 (7.5) | 0.13 | 75 | 0.89 | 60,000 |
| Example 5 | Ethylene-Propylene Copolymer | 0.920 | /4/ | 0.7 | 27,000 (135) | Ethylene-Methacrylic Acid Copolymer | 3,000 (15) | 0.5 | 62 | 1.0 | 60,000 |
| This Invention | | | | | | | | | | | |
| Example 9 Exp. 2 | Polyethylene | 0.915 | 22 | 0.85 | 136 | Ethylene-Acrylic Copolymer (Dow PE 459) | 14 | 0.61/2/ | 39 | 0.64 | 450 |
| Example 13 Exp. 2 | Polyethylene | 0.915 | 22 | 0.85 | 136 | Ethylene-Methacrylic Acid Copolymer Ionomer (Surlyn 1555) | 14 | 0.31 | 64 | 1.18 | 450 |
| Example 17 | Polyethylene | 0.962 | 28 | 1.0 | 142.5 | Ethylene-Methacrylic Acid Copolymer Ionomer (Surlyn 1555) | 7.5 | 0.31 | 64 | 0.89 | 45 |

TABLE A-2

| | | Dispersion Conditions | | | | | Rates | | | |
|---|---|---|---|---|---|---|---|---|---|---|
| Process of | Vessel and Stirring | Stirrer rpm | Impeller Tip Speed ft/min. | Temp., °C. | Resin Addition Time, Min., /12/ | Additional Stirring Time, Min. | Resin Feed Rate, g Liter · 10 Min. /7/ | Rate of Making Dispersed Material g Liter · 10 Min. /7,8/ | Yield of Powder, % | Average Particle Size, Microns |
| U.S. Pat. No. 4,174,335 | | | | | | | | | | |
| Example 2 | 100-liter Pressure Vessel with Turbine Stirrer /9/ | 500 | /10/ | 200 | 180 | 60 | 27.8 | 20.9 | Powder Not Recovered | <1 |
| Example 5 | 100-liter Pressure Vessel with Turbine Stirrer /9/ | 500 | /10/ | 170 | 180 | 60 | 27.8 | 20.9 | Powder Not Recovered | <0.9 |
| This Invention | | | | | | | | | | |
| Example 9 Exp. 2 | 1-liter Parr Reactor 4-in. internal diameter, two-toothed disc turbines, 3-in. diameter | 3,700 | 2,900 | 200 | 15 | None | 222 | 222 | 100% | 93% >53 |
| Example 13 Exp. 2 | 1-liter Parr Reactor 4-in. internal diameter, two-toothed disc turbines, 3-in. diameter | 3,700 | 2,900 | 200 | 15 | None | 222 | 222 | 100% | 100% >10 |
| Example 17 | 1-liter Parr Reactor 4-in. internal diameter, two-toothed disc turbines, 3-in. diameter | 3,700 | 2,900 | 200 | 15 | None | 222 | 222 | 100% | 97% >106 |

Although the comparisons shown in tables A1 and A-2 are not identical with regard to the thermoplastic resins used therein, these resins are all polyolefins or olefinic copolymers and are of similar molecular weight as measured by intrinsic viscosity. The ionomeric dispersing resins are of comparable structure and not too different in acid number and their degrees of neutralization are comparable, as are the ratios of thermoplastic resin to ionomeric dispersing resin. In all cases these resins were blended before dispersion, at temperatures near the melting point of the higher melting resin or just above. However, in the examples of U.S. Pat. No.

4,174,335 as shown in the upper part of Tables A-1 and A-2, the slow resin addition rates inherent in that process were employed, whereas in the examples in the lower part of Tables A-1 and A-2, the rapid addition rates of the present process are employed. It is clear that resin addition rate alone accounts for the great disparity in particle size produced by the two processes, i.e. ultrafine, less-than-3 micron particles in the process of U.S. Pat. No. 4,174,335 and the much larger particles of the present invention. As to the effect of agitation on particle size, in U.S. Pat. No. 4,174,335 it is stated that for the production of stable dispersions of ultrafine, less-than-3 micron particles, vigorous mechanical stirring must be applied as the melt blend of resins is slowly added to the aqueous alkaline medium. Such vigorous agitation is defined therein in terms of impeller power requirement per unit volume, and power number and discharge number of the impeller. No information is provided as to the geometry and size of the impellers used; only stirrer speeds are provided (Table A-2), which range from 500-5000 rpm.

Tables B-1 and B-2 which follow summarize representative examples from both batch and continuous operation with the Pluronic dispersants where resin solids level, ratio of dispersant to resin, and especially the rapid dispersion times are comparable to the process of the present invention.

TABLE B-1

| Process of | Type | Resin Density, g/cc | Melt Flow Rate, g/10 Min. | Intrinsic Viscosity /1/ | Amount, g. | Dispersant Type | Dispersant Amount, g. | Aqueous Medium, ml |
|---|---|---|---|---|---|---|---|---|
| U.S. Pat. No. 3,422,049 | | | | | | | | |
| Example I (A) | Polyethylene | 0.915 | 22 | 0.85 | 300 | Pluronic F-98 /3/ | 18 | 273 |
| Example IV | Polyethylene | 0.915 | 22 | 0.85 | 300 | Pluronic F-108 /5/ | 27 | 373 |
| Example VI | Polyethylene | 0.915 | 22 | 0.85 | 300 | Pluronic F-108 | 27 | 273 |
| Example V | Polyethylene | 0.915 | 22 | 0.85 | 300 | Pluronic F-108 | 27 | 273 |
| Example X | Polyethylene | 0.965 | 22 | — | 300 | Pluronic F-108 | 27 | 273 |
| Example XIII | Polypropylene | 0.905 | 7 | — | 300 | Pluronic F-108 | 27 | 273 |
| Example XIV | Ethylene-vinyl Acetate /13/ | 0.95 | 25 | — | 300 | Pluronic F-108 | 27 | 273 |
| U.S. Pat. No. 3,432,483 | | | | | | | | |
| Example I | Polyethylene | 0.915 | 22 | 0.85 | 1,220 | Pluronic F-98 /6/ | 226 /6/ | 2,760 /6/ |
| Example IV | Polyethylene | 0.965 | 19.5 | " | 1,060 | Pluronic F-98 | 166 /6/ | 2,600 /6/ |

TABLE B-2

| | | Dispersion Conditions | | | | | Rates | | | |
| | | | | | | | Resin Feed Rate g Liter · 10 Min. /7/ | Rate of Making Dispersed Material, g Liter · 10 Min. /7,8/ | | |
| Process of | Vessel and Stirring | Stirrer rpm | Impeller Tip Speed, ft/Min. | Temp., °C. | Resin Addition Time, Min. /12/ | Additional Stirring Time Min. | | | Yield of Powder, % | Average Particle Size, Microns |
|---|---|---|---|---|---|---|---|---|---|---|
| U.S. Pat. No. 3,422,049 | | | | | | | | | | |
| Example I (A) | [(1-liter Parr Reactor, 4-in. internal diameter fitted with either a blade type (3 blades, 2-in. diameter) or two cured-tooth turbine-type discs (3-in. diameter) used in these experiments.] | 8–10,000 | 4,200 /11/ | 200 | 8–10 | None | 1,100 | 1,100 | 100 | 3.65 |
| Example IV | | 8–10,000 | 4,200 /11/ | 200 | 0.5 | None | 19,000 | 19,000 | 86.8 | 6.5 |
| Example VI | | 3,000 | 1,570 | 250 | 13 | None | 846 | 846 | 90.4 | 4.0 |
| Example V | | 1,000 | 524 /11/ | 200 | 7 | None | 1,450 | 1,450 | 92 | 5.5 |
| Example X | | 8–10,000 | 4,200 /11/ | 200 | 7 | None | 1,500 | 1,500 | 95 | 5.1 |
| Example XIII | | 8–10,000 | 4,200 /11/ | 270–210 | 15 | None | 735 | 735 | 96.7 | <10 |
| Example XIV | | 8–10,000 | 4,200 /11/ | 200 | 7–10 | None | 1,100 | 1,100 | /14/ | 2.56 |
| U.S. Pat. No. 3,432,493 | | | | | | | | | | |
| Example 1 | (3 Turbine type rotors in a pressure | /4/ | 515 | 207 | 6.0 | None | 445 | 445 | High | 8.9 |
| Example IV | | /4/ | 515 | 220 | 7.5 | None | 545 | 545 | High | 11 |

TABLE B-2-continued

| Process of | Vessel and Stirring | Dispersion Conditions | | | | | Rates | | Yield of Powder, % | Average Particle Size, Microns |
| --- | --- | --- | --- | --- | --- | --- | --- | --- | --- | --- |
| | | Stirrer rpm | Impeller Tip Speed, ft/Min. | Temp., °C. | Resin Addition Time, Min. /12/ | Additional Stirring Time Min. | Resin Feed Rate g Liter · 10 Min. /7/ | Rate of Making Dispersed Material, g Liter · 10 Min. /7,8/ | | |
| | vessel) | | | | | | | | | |

Footnotes for Tables A-1, A-2, B-1 and B-2
/1/ Decalin solution. Calculated from [η] = ηsp/C(1 + 0.28 ηsp), where sp is specfic viscosity as in U.S. Pat. No. 4,174,335.
/2/ Considerable scatter in successive values.
/3/ Block copolymer of ethylene oxide and propylene oxide of molecular weight of 13,500 and containing 20 percent by weight of propylene oxide and 80 percent by weight of ethylene oxide.
/4/ Not disclosed.
/5/ Block copolymer of ethylene oxide and propylene oxide of 16,250 molecular weight and containg 80 percent by weight of ethylene oxide and 20 percent by weight of propylene oxide.
/6/ Amounts of resin, dispersant and water were calculated from hourly rates during a prolonged continuous run.
/7/ Units chosen to correspond to those of U.S. Pat. No. 4,174,335.
/8/ Includes time during which dispersion was being made and any additional stirring time at dispersion temperature.
/9/ No disclosure of geometry and size of impeller.
/10/ Insufficient data to calculate; see /9/.
/11/ Calculated for minimum tip speed, i.e., 2-in. impeller at lower rpm.
/12/ For this invention and U.S. Pat. No. 3,422,049, the time during which rapid stirring was applied: in this invention 15 minutes was taken as the "normal" dispersion time although the period may range from 10 to 15 minutes; for U.S. Pat. No. 3,432,483, the residence time in the dispersion reactor during continuous reaction; for U.S. Pat. No. 4,174,335, stated resin addition time.
/13/ Vinyl acetate content, 33 weight percent.
/14/ Not determined, product used as film forming latex.
/15/ Amounts in parenthesis calculated on basis of 150 g. total resin charge of the present invention.

At dispersion times from as low as 0.5 minutes to as high as 15 minutes (Table B-2), and at stirring speeds ranging from 1,000 rpm to as high as 8,000–10,000 rpm, there is little difference in number average particle size (Table B-2), which falls in the range of 2.6–11 microns for a variety of resins. Under the high resin addition rates of the powder-producing process of U.S. Pat. No. 3,422,049 with Pluronic dispersants, addition rates that are characteristic of the present invention as well as stirring rates from 1,000 to 10,000 rpm (Table B-2) have little effect on particle size. Variations in the resin feed rate corresponding to as little as 445 to as high as 19,000 grams of dispersed material produced per liter of aqueous medium per 10 minute period also failed to exert any remarkable effect on particle size. In fact, it is a disadvantage of the processes of U.S. Pat. Nos. 3,422,049 and 3,432,483 that particle size is quite insensitive to changes in variables, whatever significance the high shear stirring specified in U.S. Pat. No. 4,174,335 may have for producing stable aqueous dispersions of ultrafine particles under conditions of slow addition of a resin blend specified therein.

Accordingly, it has been concluded that in all high rate powder production processes as herein indicated, stirring beyond a minimum amount has comparatively little effect on particle size. Moreover, it appears likely that the stirring conditions given for the high rate processes shown in Table B-1 and B-2 are probably not greatly different from those of U.S. Pat. No. 4,174,335, since the stirrer speeds are in the same range, and this would apply to the present invention as well. Since the particle sizes of the present invention are considerably larger than those disclosed in U.S. Pat. No. 4,174,335, the latter is not suggestive of the particle sizes of the present invention.

The dispersions resulting from the above process are compositions comprising a dispersion of an ionomer polymer-coated, normally solid synthetic organic polymeric thermoplastic resin in water. The dispersions may be utilized in preparing water-borne coatings for metal, glass, fabrics, paper and wood, alone or in combination with other dispersions or latices; in paint formulations, and in polish formulations, etc. For some applications, it may be desirable to acidify the aqueous resin dispersions herein prior to filtration such as by the addition of small quantities of strong acid or a weak acid such as acetic acid, or to exchange the sodium ion with an ion of another metal, e.g., magnesium, calcium, barium, cadmium, zinc, aluminum, iron, cobalt, nickel, tin, etc.

To recover the powders of this invention from the resin dispersions, the temperature of the dispersion may be lowered to below about 100° C., and the resin separated from the aqueous phase in the form of discrete particles by filtration, centrifugation, evaporation of the water, and the like. It is a feature of this invention that the powder product contains dispersing agent substantially retained on the surface of the resin particles. The ionomeric dispersing resin is substantially insoluble in water and is not removed. Moreover, in the case of such ordinarily tacky resins as ethylene-vinyl ester copolymer, the resins will be rendered non-tacky by being uniformly coated with a thin film of ionomer polymer.

Drying of the recovered finely-divided resins yields a free-flowing powder of fine particle size and a particle size distribution that can be controlled to within narrow limits by proper choice of such operational parameters as dispersion temperature, total resin solids, ratio of ionomer to thermoplastic resin, degree of neutralization of the ionomer, and in particular how these variables relate to the initial carboxylic acid content of the copolymer from which the ionomer is made, and the nature and composition of the termoplastic resin. Generally, all of the dispersed particles have diameters less than about 800 and greater than about 10 microns. Especially preferred are particles of narrow size distribution wherein the number average particle size is less than about 150 microns, and more desirably, less than about 100 microns, but not less than about 10 microns.

The finely-divided resins of this invention are superior in powder form for static or fluidized dip coating, spraying, dusting, and flame spraying applications as well as for preparing stable dispersions in water or some other medium for use in roller, dip, or spray coating. The relatively high molecular weight resins of this invention also find use in the preparation of heat resistant coatings, in the preparation of molded or formed shapes by powder or slush molding techniques, and in the preparation of foams in combination with conventional blowing agents.

In addition to the above-mentioned uses of the powder products of this invention, two special uses have discovered:

Thermoplastic Elastomers

When ethylene-vinyl acetate copolymers containing about 35 to 65, preferably 40 to 60, weight percent of vinyl acetate, are dispersed with about 5 to about 40 parts and preferably 8–20 parts by weight of ionomer dispersing resin per 100 parts by weight of the copolymer under the condition of this invention, and the recovered powder products are molded into articles such as sheeting, hose, gasketing, O-rings, etc., by conventional equipment and techniques, the articles exhibit the properties of thermoplastic elastomers, e.g., they possess tensile strengths considerably higher than that which would be expected for a linear relationship between the tensile strength of the ethylene-vinyl acetate copolymer itself and the tensile strength of the ionomer. For example, the measured tensile strength of an ethylene-vinyl acetate copolymer containing about 40 weight percent of vinyl acetate that was used was about 1410 psi, whereas the measured tensile strength of the Surlyn 1555 was 2,610 psi. Compression molded sheets (Table XVIII) made from powders containing 10 and 20 parts by weight of Surlyn 1555 per 100 parts by weight of the ethylene-vinyl acetate copolymer had tensiles of 2,000 to 2,200 psi, respectively, whereas the interpolated values to be expected for a linear relationship of tensile strength with composition would only be 1,510 to 1,600 psi, respectively. Hand in hand with the positive deviation in tensile strength goes a corresponding decrease in melt flow rate to as low as 0.59 and 0.42 g/10 min, respectively, as compared to 1.40 g/10 min, for the original ethylene-vinyl acetate copolymer and 0.59 for the Surlyn 1555. Solubility studies have shown the powder samples to be completely soluble and therefore not gelled. Accordingly, these elastomeric compositions can be molded like thermoplastics but exhibit tensile properties that would be acceptable for a peroxide-cured ethylene-vinyl acetate copolymer elastomer.

It has also been found that similar powder products made by dispersion and comprising 10 and 20 parts by weight of Surlyn 1555 in 100 parts by weight of low density polyethylene, when molded into sheets, exhibit tensile strengths that are lower than the interpolated linear values, i.e., 1300 and 1420 psi, respectively, as compared to interpolated values of 1500 and 1620 psi. Thus the system polyethylene-Surlyn 1555 exhibits negative tensile deviations.

Simple mill-mixing of similar compositions of Surlyn 1555 and ethylene-vinyl acetate and of Surlyn 1555 and low density polyethylene will also yield materials respectively exhibiting positive and negative deviations of tensile strength from linearity. However, the positive deviations shown by the mill blends of Surlyn 1555 with ethylene-vinyl acetate are about 100 to 300 psi less than those of the corresponding blends made by dispersion (Table XVIII). However, mill blends of Surlyn 1555 with low density polyethylene show less negative deviation from linearity than dispersion blends, amounting to about 150 psi.

It is speculated that increased strength properties may be a consequence of a type of intermolecular interaction between the polar groups of the ethylene-vinyl acetate copolymer and Surlyn 1555, and that this interaction proceeds to a greater extent in the specimens derived from the powder process because more intimate mixing is possible than in simple mill-blending. It may also be that ionomer-encapsulated particles may persist, even into molded specimens, and that ionomer-ionomer interactions may play a part. These speculations are offered merely by way of a possible explanation of the phenomena noted herein are not intended to limit the invention in any way.

Impact Modifier Powders

It is well-known in the art that ethylene-vinyl acetate copolymers containing about 40–50 weight percent of vinyl acetate are excellent impact modifiers in rigid polyvinyl chloride. As ordinarily supplied, however, such copolymers are available as pellets which tend to adhere to each other because of their tacky nature. Since polyvinyl chloride is supplied as a powder with a particle size of about 100–150 microns, it is difficult to blend the pellets into it without imparting an undesirable heat history. Polyvinyl chloride formulators and processors are becoming increasingly committed to powder blending technology and are requiring that ethylene-vinyl acetate copolymer impact modifiers be available as dry-blendable powders.

Dispersions of these tacky resins made with ethylene oxide-propylene oxide block copolymer dispersing agents coalesce upon filtration and the dispersed material cannot be recovered as a powder. Heretofore, tacky copolymers such as the foregoing could only be recovered as dry powders by dispersing them with alkali metal soaps and after dispersion chemically converting the soap to the free acid or to an alkaline earth metal soap (U.S. Pat. No. 4,151,135). The fatty acid or alkaline earth metal, e.g. calcium, soap thereof coats the tacky copolymer particles sufficiently for the latter to be recovered by filtration, dried, and applied as dry-blendable impact modifier powders in rigid polyvinyl chloride. Attempts to recover the dispersed material coated only with the fatty acid in the alkali metal, e.g., sodium, soap form have been unsuccessful. However, in the present invention, where an ionomeric resin in the sodium form is used as the dispersing agent, the powder product can readily be recovered by filtration and dried and even resists considerable compaction. Surprisingly, it is not necessary to convert the alkali metal, i.e., sodium form of the ionomer resin to the corresponding acid or calcium form although at times this latter procedure may be advantageous and is therefore within the scope of this invention. The ionomer dispersing resin thus appears to coat the outside of the finely-divided, tacky, ethylene-vinyl acetate copolymer particles, thus rendering them resistant to coalescence and permitting them to be applied as dry powders.

Ethylene-vinyl acetate copolymer powders intended as dry-blendable impact modifiers desirably have particle sizes in the range of about 50–500 microns, with substantially no particles below 10 microns, in diameter. Ethylene-vinyl acetate powders such as these are not obtained by the process of U.S. Pat. No. 4,174,335, which is directed to the production of stable latexes in which the particle size is typically no more than 3 microns. The latter particles, if they could be recovered as powders, would be entirely too fine for use as impact modifier powders in rigid polyvinyl chloride because they would tend to segregate from the coarser polyvinyl chloride powder during handling due to the great disparity in particle size. In addition, they would have other objectionable features such as presenting an increased dust explosion hazard and would be in the respirable dust particle range (e.g., below about 10 microns).

The process of the present invention, however, readily lends itself to the production, at high rates, of ionomer-coated ethylene-vinyl acetate copolymer powders suitable for dry blending into rigid polyvinyl chloride powder formulations. The particle size and particle size distribution can be substantially controlled, e.g., by suitable adjustment of the ratio of ionomer dispersing resin to ethylene-vinyl acetate copolymer or by blending the resins before dispersion and thereafter suitably selecting the dispersion temperature or extending the hold time at dispersion temperature.

Ethylene-vinyl acetate copolymer powder made with, and containing both 10 and 20 parts by weight of ionomer resin per 100 parts by weight copolymer, are both dry blendable with polyvinyl chloride and impart excellent impact resistance thereto. Aging properties (weatherometer) of rigid polyvinyl chloride formulations made with the powders as impact modifiers compare favorably with those made with pellets of the parent ethylene-vinyl acetate copolymer.

The following examples will further illustrate this invention without limitations. All parts are by weight unless otherwise indicated.

Resins

Resins used in the examples were characterized by their flow rates determined according to ASTM D-1238. "Melt Index" hereinafter refers to a melt flow rate determined according to Condition E thereof, i.e., with a 2,160 g weight at 190° C. Unless otherwise specified, the term "melt flow rate" hereinafter means melt flow rate determined according to Condition B thereof, with a 2,160 g weight at 125° C.

Intrinsic viscosity [η] was also employed to characterize the resins and was calculated as in U.S. Pat. No. 4,174,335 from the equation:

$$[\eta] = \eta_{sp}/C(1 + 0.28\eta_{sp}),$$

where $\eta_{sp}$ is the specific viscosity of the resin measured in decalin solution at a concentration (C) of 0.1 g/100 ml.

Thermoplastic Resins

Petrothene NA 202—U.S. Industrial Chemicals Co.

Petrothene NA 202 is a low density polyethylene supplied in the form of pellets. It has a melt index of 22 g/10 min., a density of 0.915 g/cc, and an intrinsic viscosity 0.85.

Petrothene LS-630—U.S. Industrial Chemicals Co.

Petrothene LS-630 is a high density polyethylene; melt index 28 g/10 min.; density, 0.962 g/cc; intrinsic viscosity 1.0.

Ethylene-Vinyl Acetate (EVA) Copolymer (Vynathene EY 901)—U.S. Industrial Chemicals Co.

Vynathene EY 901 is supplied as pellets and was employed as a model ethylene-vinyl acetate copolymer. It contains about 40 weight percent (nominal) of vinyl acetate. It has a melt flow rate of 0.5–1.5 g/10 min. and a density of 0.962 g/cc.

Dispersing Resins

Ethylene-Acrylic Acid (EAA) Copolymers—Dow Chemical Co.

Three EAA coppolymers trade-named "Dow Polyethylene 435, 455, and 459", were tested as dispersing resins, after conversion with sodium hydroxide to the sodium ionomer form in situ during dispersion. Properties of the EAA copolymers were as follows:

| EAA Copolymer | Nominal Values Provided by Supplier | | | Measured Values | |
|---|---|---|---|---|---|
| | Density g/cc | Melt Index g/10 Min. | Acrylic Acid Content Wt. % | Acrylic Acid Content Wt. % | Acid No. |
| Dow PE 435 | 0.925 | 11.0 | 3.5 | 3.0 | 23 |
| Dow PE 455 | 0.932 | 5.5 | 8 | 5.4 | 42 |
| Dow PE 459 | 0.932 | 9.0 | 8 | 5.0 | 39 |

Calculations in this invention are based on measured analtyical values obtained for EAA copolymers.

Surlyn 1555—E. I. duPont de Nemours and Co.

Surlyn 1555 is the sodium form of a partially-neutralized ethylene-methacrylic acid copolymer, available as pellets. It is therefore a terpolymer of ethylene, methacrylic acid and sodium methacrylate. Duplicate analysis by atomic absorption showed the presence of 1.02, 1.04 weight percent sodium equivalent to 4.84 weight percent (average) of sodium methacrylate. Titration with standard methanolic KOH at about 50°–60° C. of Suryln 1555 in 2:1 decalin-dimethylacetamide solution gave an unneutralized methacrylic acid content of 5.93 weight percent. Accordingly, the Surlyn 1555 used here contained a total of 9.8 weight percent of methacrylic acid units before conversion to ionomer, corresponding to an initial acid number of 64. According to the above analysis the ionomer was 39.5% neutralized, as supplied. All calculations in the invention are based on the foregoing analysis.

The Surlyn 1555 used in the examples had a melt index of 10 g/10 min. and a density of 0.945 g/cc. Its melt flow rate was 0.59 g/10 min. and its intrinsic viscosity, 0.31, measured in 2:1 decalin-dimethyl acetamide solution.

Dispersion Reactor

The dispersion experiments described hereinafter in the examples were performed in a one-liter Parr pressure reactor (Parr Instrument Company, Moline, Ill.). The reactor (4-inch internal diameter) was equipped with a thermocouple well, blow-out disc assembly, and a mechanical stirrer. The stirrer was driven by a 1-horsepower electrical motor (Dayton Electric Manufacturing Co., Chicago, Ill.) attached to a drill press (Craftman 150, Sears, Roebuck & Co.). The reactor was heated electrically with an external heating jacket. The impeller consisted of two 3-inch diameter toothed discs mounted about 1-inch apart on the stirrer shaft.

General Dispersion Procedure

At the start of a dispersion experiment the aqueous dispersion medium was charged to the open rector. Deionized water was used throughout and, unless otherwise specified, the volume added was 450 ml. In many experiments, sodium hydroxide solutions in deionized water replaced deionized water as the aqueous dispersion medium.

In some experiments, the resin to be dispersed and the dispersing resin were each added separately as pellets. In other experiments, the two resins were blended before dispersion by milling them together in a two-roll rubber mill for 5 minutes at 235° F. (113° C.) or as otherwise specified. Thereafter the blends were cut into small pieces for adding to the open dispersion reactor.

The reactor was then closed, connected to the drill press stirrer assembly and heated to the dispersion temperature with the stirrer turned off. To reach 200° C., the most commonly used dispersion temperature, a period of about 30 minutes were required. Immediately upon reaching the dispersion temperature, the stirrer was started at 3,700 rpm, the heat to the heating jacket was turned off and granulated dry ice was packed over the top of the reactor to hasten cooling. With continuous stirring at 3,700 rpm, the reactor was cooled at about 100° C. At this point the stirring was discontinued. Stirring speed was monitored frequently during this period with a Strobotac Type 1531-A (General Radio Co., Concord, Mass.). The total period from the time the stirring was started to the time the temperature reached 100° C. and the reactor could be safely opened, amounted to 10 to 15 minutes. This 10 to 15 minute dispersion time is referred to hereinafter as the "normal" dispersion time. In this procedure the temperature at which stirring was started is referred to hereinafter as the "dispersion temperature". In some experiments, the dispersion period was extended by applying longer hold times, up to 20 minutes, at the temperature of dispersion. Thereafter the reactor was cooled as described above, to 100° C., over 10 to 15 minutes.

After cooling to 100° C., the reactor was opened and the dispersion was promptly removed. The dispersed matter was suction filtered; washed, if desired, and dried. Recovery as powder was substantially 100%. After drying, the powder was screened to determine particle size distribution. In most instances where substantial fractions having diameters <53 microns were formed on screen analysis, a specimen of the total product was examined under an optical microscope to determine how many particles per 100 particles had diameters below 10 microns. In general the number was small, i.e. 0-6/100.

In-Situ Neutralization of Dispersing Resins

In experiments in which Surlyn 1555 was the dispersing resin, sodium hydroxide was often added to the dispersion medium to neutralize some or all of the residual unneutralized methacrylic acid units present. In some experiments, amounts of sodium hydroxide in excess of neutralization of the methacrylic acid units were added.

In the tables hereinafter, the amount of sodium hydroxide added is given in terms of weight percent concentration in the aqueous medium. From this concentration and the total volume of aqueous medium, calculations were made of the ratio of equivalents of sodium hydroxide to unneutralized methacrylic acid units (NaOH/—COOH) in the Surlyn 1555 as added. Since Surlyn 1555 also contains sodium methacrylate units, the ratio of total sodium ion present during dispersion to total methacrylic acid units present, neutralized and unneutralized, was also calculated (Ma+/MAA). This ratio relates the degree of neutralization plus any amount of excess alkali to total carboxylic acid amount of the dispersing resin. In experiments where Dow ethylene-acrylic acid copolymers were used as dispersing resins, sufficient alkali was added to the aqueous medium to give the stated degrees of neutralization.

EXAMPLE 1

In accordance with the general dispersion procedure above, Petrothene NA 202 low density polyethylene was dispersed with three different Dow ethylene acrylic acid copolymers (Dow polyethylenes No. 435, 455, and 459), these copolymer resins as well as the Petrothene NA 202 being added separately as pellets in each experiment, and with sufficient sodium hydroxide being added to the aqueous medium for half neutralization in situ of the copolymers during dispersion. The powder products recovered are described in Table I along with the corresponding dispersion conditions.

Particle sizes are relatively coarse, with little material below 53 microns being present. Particle size distributions are rather broad. Increasing the acrylic acid content of the ionomer precursor from 3% (Dow PE 435) to 5–5.5% (Dow PE 455 and 459) favors finer particle size at least at the lower ionomer/polyethylene ratio. The effect of increasing ionomer/polyethylene ratio is variable.

TABLE I

POWDERS MADE BY DISPERSING PETROTHENE NA 202 LOW DENSITY POLYETHYLENE WITH DOW ETHYLENE-ACRYLIC ACID COPOLYMERS IN WATER CONTAINING SUFFICIENT NaOH FOR HALF NEUTRALIZATION. RESINS INTRODUCED SEPARATELY AS PELLETS

Aqueous Medium 450 ml.
Dispersion Temp. 200° C.
Dispersion Time Normal

| Exp. No. | Petrothene NA 202, g. | EAA Copolymer Name | g. | Wt. % Acrylic Acid | Melt Index, g/10 Min. | Particle Size Distribution in Weight Percent per Particle Size Fraction (Microns) | | | | | | | |
|---|---|---|---|---|---|---|---|---|---|---|---|---|---|
| | | | | | | <53 | 53–106 | 106–149 | 149–250 | 250–420 | 420–600 | 600–850 | >850 |
| 1 | 136 | Dow PE 435 | 14 | 3.0 | 11 | ← | ← | | Marginal Dispersion | | | → | → |
| 2 | 125 | " | 25 | 3.0 | 11 | 0.9 | 5.3 | 7.1 | 24.3 | 29.6 | 16.0 | 11.7 | 4.5 |
| 3 | 75 | " | 75 | 3.0 | 11 | 2.7 | 14.1 | 10.5 | 22.6 | 27.8 | 11.6 | 5.1 | 5.5 |
| 4 | 136 | Dow PE 455 | 14 | 5.4 | 5.5 | 11.4 | 30.0 | 18.5 | 20.5 | 12.7 | 4.1 | 1.5 | 1.3 |
| 5 | 125 | " | 25 | 5.4 | 5.5 | 8.5 | 21.9 | 13.5 | 21.2 | 13.5 | 8.8 | 5.6 | 7.0 |
| 6 | 75 | " | 75 | 5.4 | 5.5 | 11.6 | 19.2 | 9.6 | 23.8 | 15.8 | 5.8 | 3.8 | 10.0 |
| 7 | 136 | Dow PE 459 | 14 | 5.0 | 9.0 | 9.1 | 29.4 | 14.3 | 16.2 | 10.7 | 5.2 | 1.1 | 13.9 |
| 8 | 125 | " | 25 | 5.0 | 9.0 | 11.7 | 31.2 | 17.0 | 18.1 | 10.3 | 6.0 | 2.4 | 3.2 |
| 9 | 75 | " | 75 | 5.0 | 9.0 | 3.0 | 7.3 | 6.5 | 18.2 | 35.5 | 10.2 | 5.0 | 14.3 |

EXAMPLE 2

In accordance with the general dispersion procedure, Petrothene NA 202 low density polyethylene was dispersed with Dow Polyethylene No. 455 in one series of experiments and Dow Polyethylene No. 459 in another series of experiments. In each experiment the Petrothene NA 202 and the Dow ethylene-acrylic acid copolymers were introduced into the dispersion vessel separately, as pellets, and enough sodium hydroxide was added to the water to neutralize half of the carboxyl groups of the Dow copolymer. In each series dispersions were made at two different temperatures: 200° and 250° C. The results of the experiments appear in Table II.

The effect of going to a 250° C. dispersion temperature was to narrow the particle size distribution in the intermediate particle size range at the expense of the finer particle size fractions. Under the conditions employed, judicious adjustment of the dispersion temperature can thus be used to achieve a degree of control over particle size.

thene NA 202 low density polyethylene (136 g, 125 g, and 100 g) in the form of pellets was charged to the reactor along with Surlyn 1555 (14 g, 25 g, and 50 g), also in the pellet form, and with 450 ml deionized water in each experiment. Experimental data are tabulated in Table IV. Dispersion times in Experiments 1, 2 and 3 were 12 minutes, 51 seconds; 12 minutes; and 15 minutes, respectively. It is apparent that as the ratio of Surlyn 1555 ionomeric resin to polyethylene increases, the particle size distribution of the powder narrows and shifts to particle sizes below 53 microns. Microscopic examination of the 53-micron fractions shows, however, that no more than about 4 per 100 particles have a diameter of 5–10 microns; the remainder are larger. The Surlyn 1555 used in the experiment contained 9.8 weight percent methacrylic acid (total) and was 39.5% neutralized. Comparison with Example 1 shows that much finer polyethylene particles are produced with Surlyn 1555 than with the Dow ethylene-acrylic acid-based ionomers which contain 5–5.5% acrylic acid. Carboxylic acid content of the ionomer precursor thus represents another parameter for controlling particle size.

TABLE II

POWDERS MADE BY DISPERSING PETROTHENE NA 202 LOW DENSITY POLYETHYLENE WITH DOW ETHYLENE-ACRYLIC ACID COPOLYMERS IN WATER CONTAINING NaOH SUFFICIENT FOR HALF NEUTRALIZATION. RESINS INTRODUCED SEPARATELY AS PELLETS. DISPERSIONS AT 200 and 250° C.

Aqueous Medium 450 ml.
Time Normal

| Exp. No. | Petrothene NA 202 g. | Resins Dispersant Name | Melt Index g/10 Min. | Acrylic Acid, Wt. % | Amt., g. | Dispersion Temp. °C. | Particle Size Distribution in Weight Percent per Particle Size Fraction (Microns) | | | | | | | |
|---|---|---|---|---|---|---|---|---|---|---|---|---|---|---|
| | | | | | | | <53 | 53–106 | 106–149 | 149–250 | 250–420 | 420–600 | 600–850 | >850 |
| 1 | 136 | Dow PE 459 | 9.0 | 5.0 | 14 | 200 | 9.1 | 29.4 | 14.3 | 16.2 | 10.7 | 5.2 | 1.1 | 13.9 |
| 2 | 136 | Dow PE 459 | 9.0 | 5.0 | 14 | 250 | 3.2 | 6.8 | 12.4 | 22.2 | 34.4 | 10.2 | 5.4 | 5.4 |
| 3 | 136 | Dow PE 455 | 5.5 | 5.4 | 14 | 200 | 11.4 | 30.0 | 18.5 | 20.5 | 12.7 | 4.1 | 2.8 | — |
| 4 | 136 | Dow PE 455 | 5.5 | 5.4 | 14 | 250 | 1.3 | 1.7 | 4.1 | 39.4 | 49.1 | 3.0 | 1.3 | 5.0 |
| 5 | 125 | Dow PE 455 | 5.5 | 5.4 | 25 | 200 | 9.1 | 23.6 | 14.5 | 22.8 | 14.5 | 9.5 | 6.0 | 7.0 |
| 6 | 125 | Dow PE 455 | 5.5 | 5.4 | 25 | 250 | 3.5 | 8.1 | 8.1 | 23.1 | 29.1 | 15.0 | 1.9 | 11.1 |

EXAMPLE 3

As described in the general dispersion procedure, Petrothene NA 202 low density polyethylene was dispersed with Dow Polyethylene No. 455 ethylene acrylic acid copolymer, neutralized to different degrees in situ during dispersion, both resins being added separately as pellets. Table III summarizes the results of these experiments.

As the degree of neutralization approaches completion, the particle size distribution of the powder product narrows and shifts to smaller particle sizes. From this it is evident that degree of neutralization of the ionomeric dispersing resin is another parameter than can be used to adjust the particle size and particle size distribution of the powder products.

TABLE III

Powders Made by Dispersing Petrothene NA 202 Low Density Polyethylene with Dow Polyethylene 455 Ethylene-Acrylic Acid Copolymer Neutralized to Different Degrees in situ During Dispersion. Resins Introduced Separately as Pellets

| Aqueous Medium | 450 ml |
| Petrothene NA 202 | 136 g |
| Dow PE 455 | 14 g |
| Dispersion Temp. | 200° C. |
| Dispersion Time | Normal |

| Exp. No. | NaOH g. Added | NaOH—COOH, Molar | Particle Size Distribution in Weight Percent per Particle Size Fraction (Microns) | | | | | | | |
|---|---|---|---|---|---|---|---|---|---|---|
| | | | <53 | 53–106 | 106–149 | 149–250 | 250–420 | 420–600 | 600–850 | >850 |
| 1 | 0.125 | 0.30 | 3.3 | 12.1 | 11.4 | 28.1 | 24.2 | 13.1 | 5.9 | 1.8 |
| 2 | 0.250 | 0.60 | 8.9 | 31.4 | 16.4 | 23.7 | 12.4 | 3.7 | 0.9 | 2.5 |
| 3 | 0.375 | 0.89 | 8.9 | 29.2 | 22.0 | 20.5 | 8.7 | 5.7 | 2.2 | 2.7 |

EXAMPLE 4

In the dispersion reactor, and in accordance with the general dispersion procedure described above, a series of three experiments were performed in which Petro-

TABLE IV

POWDERS MADE BY DISPERSING
PETROTHENE NA 202 LOW DENSITY
POLYETHYLENE IN WATER WITH SURLYN 1555
RESINS INTRODUCED SEPARATELY AS PELLETS

| | Aqueous Medium | | 450 ml | | | |
|---|---|---|---|---|---|---|
| | Dispersion Temp. | | 200° C. | | | |
| | Dispersion Time | | Normal | | | |
| | Resins | | Particle | | | |
| | Petro-thene | Surlyn | Size Distribution in Wt. Percent per Particle Size Fraction (Microns) | | | |
| Exp. No. | NA 202, g | 1555, g | <53 | 53–106 | 106–149 | 149–250 | 250–420 | >420 |
| 1 | 136 | 14 | 31.6[1] | 31.4 | 11.8 | 15.9 | 8.4 | 0.8 |
| 2 | 125 | 25 | 69.3[2] | 22.3 | 4.4 | 3.3 | 0.7 | Trace |
| 3 | 100 | 50 | 73.8[3] | 18.8 | 3.4 | 3.1 | 0.9 | Trace |

[1]Microscopic examination showed at most 3-4 particles per 100 were of 5-10 microns in diameter; most were 10-100 microns in diameter (examination made on total powder).
[2]2-3 particles of 5-10 microns diameter per 100 particles; most were 20-100 micron particles (examination on total powder).
[3]About 1 particle per 100 was 5-10 microns in diameter; most were 20-100 micron particles (examination on total powder).

EXAMPLE 5

Experiment No. 1 of Table IV was repeated exactly, except that stirring at 3,700 rpm was stopped after 7 minutes in the cooling period instead of at the end of the 12 minute, 51 second period when the temperature had reached 100° C. in Experiment No. 1 of Table IV. The stirrer was allowed to turn only slowly during the remaining minutes of the cooling period. Screen analyses of the powder product and that of Experiment No. 1 of Table IV are compared in Table V. The analyses do not differ significantly. Thus it is evident that the so-called 10 to 15-minute "normal" dispersion time can be reduced to at least 7 minutes, without producing a significant change in particle size.

TABLE V

POWDERS MADE BY
DISPERSING PETROTHENE NA 202
LOW DENSITY POLYETHYLENE
IN WATER WITH SURLYN 1555
RESINS INTRODUCED SEPARATELY AS PELLETS
REDUCTION OF DISPERSION TIME

| | Aqueous Medium | | 450 ml. | | | |
|---|---|---|---|---|---|---|
| | Petrothene NA 202 | | 136 g | | | |
| | Surlyn 1555 | | 14 g | | | |
| | Dispersion Temp. | | 200 C. | | | |
| | | Particle Size Distribution in Weight Percent per Particle Size Fraction (Microns) | | | | |
| Exp. No. | Dispersion Time, Min. | <53[1] | 53–106 | 106–149 | 149–250 | 250–420 | >420 |
| 1 | 12 min., 51 sec. | 31.6 | 31.4 | 11.8 | 15.9 | 8.4 | 0.8 |
| 2 | 7 | 30.7 | 31.6 | 18.6 | 10.4 | 7.8 | 7.8 |

[1]On microscopic examination about 1 particle per 100 was 5-10 microns in diameter; most were 20-100 micron particles (examination on total powder).

EXAMPLE 6

Two additional experiments were performed under the dispersion conditions of Example 4, except that the total resin solids was increased to 33 and 50%. In Table VI the results of these experiments are compared with those obtained at 25%. It is evident that increasing total solids during the dispersion process also favors narrower particle size distributions and finer particles. Therefore, regulation of total solids provides a means of controlling particle size.

TABLE VI

POWDERS MADE BY DISPERSING PETROTHENE NA 202 LOW
DENSITY POLYETHYLENE IN WATER WITH SURLYN 1555. RESINS
INTRODUCED SEPARATELY AS
PELLETS. EFFECT OF TOTAL SOLIDS.

| | | | Dispersion Temp. | 200° C. | | | | | |
|---|---|---|---|---|---|---|---|---|---|
| | | | Dispersion Time | Normal | | | | | |
| | Petrothene | Surlyn | | Total Resin | Particle Size Distribution in Weight Percent per Particle Size Fraction (Microns) | | | | |
| Exp. No. | NA 202, g. | 1555, g. | Water, ml. | Solids, Wt. % | <53 | 53–106 | 106–149 | 149–250 | 250–420 | >420 |
| 1 | 136 | 14 | 450 | 25 | 31.6[1] | 31.4 | 11.8 | 15.9 | 8.4 | 0.8 |
| 2 | 182 | 18 | 400 | 33 | 41.3[2] | 27.2 | 12.5 | 11.4 | 6.5 | 1.1 |
| 3 | 273 | 27 | 300 | 50 | 63.5 | 24.1 | 6.0 | 4.8 | 1.2 | 0.4 |

[1]Upon microscopic examination about 1 particle per 100 was 5-10 microns in diameter; most were 20-100 micron particles (examination on total powder).
[2]No particles out of 100 examined below 10 microns in diameter (examination on total powder).

EXAMPLE 7

Following the general dispersion procedure, Petrothene LS 630 high density polyethylene was dispersed in water at 200° C. with Surlyn 1555. Table VII contains the results of these experiments.

As in Example 4, it is seen that increasing the relative amount of Surlyn 1555 employed for the dispersion leads to a narrowing of particle size distribution in the finest particle size range.

TABLE VII

Powders Made by Dispersing Petrothene LS 630 High Density Polyethylene in Water with Surlyn 1555. Resins Introduced Separately as Pellets

| | | Water | | 450 ml | | | |
|---|---|---|---|---|---|---|---|
| | | Dispersion Temp. | | 200° C. | | | |
| | | Dispersion Time | | Normal | | | |
| | Resins | | | | | | |
| | Petrothene LS-630, | Surlyn 1555, | Particle Size Distribution in Weight Percent per Particle Size Fraction (Microns) | | | | |
| Exp. No. | g. | g. | <53 | 53–106 | 106–149 | 149–250 | 250–420 | >420 |
| 1 | 136 | 14 | Trace | 1.0 | 0.8 | 7.6 | 21.8 | 68.8 |
| 2 | 125 | 25 | 16.6 | 26.9 | 10.5 | 10.5 | 4.7 | 0.8 |
| 3 | 100 | 50 | 70.9[1] | 16.1 | 4.1 | 4.8 | 2.2 | 1.9 |

[1] Microscopic examination revealed no particles less than 10 microns in diameter (examination made on total powder).

TABLE VIII

Powders Made by Dispersing Vynathene EY 901 Ethylene-Vinyl Acetate Copolymer in Water with Surlyn 1555. Resins Introduced Separately as Pellets

| | | Water | | 450 ml | | | |
|---|---|---|---|---|---|---|---|
| | | Dispersion Temp. | | 200° C. | | | |
| | | Dispersion Time | | Normal | | | |
| | Resins | | | | | | |
| | Vynathene EY 901, | Surlyn 1555, | Particle Size Distribution in Weight Percent per Particle Size Fraction (Microns) | | | | |
| Exp. No. | g. | g. | <53 | 53–106 | 106–149 | 149–250 | 250–420 | >420 |
| 1 | 136 | 14 | Trace | 5.2 | 10.7 | 25.9 | 16.3 | 41.9 |
| 2 | 125 | 25 | 35.0[1] | 22.8 | 12.3 | 12.7 | 11.9 | 5.2 |
| 3 | 100 | 50 | 40.7 | 25.7 | 12.9 | 9.5 | 7.8 | 3.3 |

[1] Microscopic examination showed no particles out of 100 with a diameter of 10 microns or less (examination made on total powder).

EXAMPLE 8

In a series of three experiments performed according to the general dispersion procedure, Vynathene EY 901, and ethylene-vinyl acetate copolymer containing about 40 weight percent of vinyl acetate (136 g, 125 g, and 100 g) was dispersed with Surlyn 1555 (14 g, 25 g, and 50 g) respectively, in 450 ml of deionized water in each experiment. White, free-flowing resin powders wre recovered in high yields in each experiment. Table VIII summarizes the experimental details, including the screen analysis of the powder products.

As in the dispersion of polyethylene under similar conditions (Example 4 and 7), an increase in the ratio of Surlyn 1555 to Vynathene EY 901 leads to a narrowing of the particle size distributions, with a shift to finer particle sizes. The powders have good resistance to compaction under the pressure generated by their own weight. For example, they do not coalesce under a pressure of 1 psi applied at 39°–40° C. for 24 hours, however, they are not as compaction-resistant as the calcium stearate-coated powders of U.S. Pat. No. 4,151,135.

It is surprising that the powders of this example, coated with Surlyn 1555, an ionomer in the sodium-ion form, can be recovered as dry powders. Comparabe powders coated with sodium stearate, for example, cannot be so recovered (U.S. Pat. No. 4,151,135).

EXAMPLE 9

Petrothene NA 202 low density polyethylene was dispersed with Dow Polyethylene 459 ethylene-acrylic acid copolymer in a series of experiments in which the effect of blending the two resins before dispersion was compared with results obtained when the two resins were added to the reactor separately as pellets. The results are shown in Table IX.

At the degree of neutralization employed (0.65), the blended resins gave narrower particle size distributions of finer particles. Accordingly, blending before dispersion can be employed to control particle size and particle size distribution.

TABLE IX

POWDERS MADE BY DISPERSING PETROTHENE NA 202 LOW DENSITY POLYETHYLENE WITH DOW POLYETHYLENE 459 ETHYLENE-ACRYLIC ACID COPOLYMER. COMPARISON OF BLENDING RESINS BEFORE DISPERSION WITH SEPARATE ADDITION

| | | | Aqueous Medium | | 450 ml. | | | | | | |
|---|---|---|---|---|---|---|---|---|---|---|---|
| | | | Dispersion Temp. | | 200° C. | | | | | | |
| | | | Dispersion Time | | Normal | | | | | | |
| | Resins | | | | | | | | | | |
| | | | Mill | NaOH | | Particle Size Distribution in Weight Percent per Particle Size Fraction (Microns) | | | | | |
| | Petrothrene | Dow PE | Blended | | | —COOH, | | | | | | |
| Exp. No. | NA 202 g. | 459 g. | Before Dispersion[1] | Conc., Wt. % | g. | Molar | <53 | 53–106 | 106–149 | 149–250 | 250–420 | 420–600 | >600 |
| 1 | 136 | 14 | No | 0.055 | 0.25 | 0.64 | 9.1 | 29.4 | 14.3 | 16.2 | 10.7 | 5.2 | 13.9 |
| 2 | 136 | 14 | Yes | 0.055 | 0.25 | 0.64 | 7.1 | 40.4 | 24.1 | 15.0 | 5.0 | 8.4(>420) | — |
| 3 | 125 | 25 | No | 0.1 | 0.45 | 0.65 | 11.7 | 31.2 | 17.0 | 18.1 | 10.3 | 6.0 | 3.2 |
| 4 | 125 | 25 | Yes | 0.1 | 0.45 | 0.65 | 28.9 | 38.4 | 15.3 | 11.4 | 4.1 | 1.8(>420) | — |

[1] 5 minutes at 113° C.

EXAMPLE 10

This example compares the relative effects of blending resins before dispersion with separate addition of the resins in the production of powder products by dispersing Vynathene EY 901 ethylene-vinyl acetate copolymer with Dow Polyethylene 459 ethylene-acrylic acid copolymer neutralized approximately 65% in situ during dispersion. A series of four experiments were performed, following the general dispersion procedure described hereinabove. Results are summarized in Table X.

Blending of the two resins (5 minutes at 113° C. on a two-roll mill) is seen to shift the particle size distribution to finer particle sizes, as compared to separate addition of the pellets. However, as compared to powders made in dispersing low density polyethylene with this same ethylene-acrylic acid based ionomer (Example 9, Table IX), particle sizes are coarser and the effect on particle size distribution is less clear-cut.

TABLE X

POWDERS MADE BY DISPERSING VYNATHENE EY 901 ETHYLENE-VINYL ACETATE COPOLYMER WITH DOW PE 459 ETHYLENE-ACRYLIC ACID COPOLYMER APPROXIMATELY 65% NEUTRALIZED IN SITU DURING DISPERSION. COMPARISON OF BLENDING RESINS BEFORE DISPERSIONS WITH SEPARATE ADDITION

Aqueous Medium 450 ml  
Dispersion Temp. 200° C.  
Dispersion Time Normal

| | Resins | | | NaOH | | Particle Size Distribution in Weight Percent per Particle Size Fraction (Microns) | | | | | | |
|---|---|---|---|---|---|---|---|---|---|---|---|---|
| Exp. No. | Vynathene EY 901, g. | Dow PE 459, g. | Resins Blended before Dispersion | Conc., Wt. % | NaOH g. | —COOH, Molar | <53 | 53–106 | 106–149 | 149–250 | 250–420 | 420–600 | >600 |
| 1 | 136 | 14 | No | 0.055 | 0.25 | 0.64 | 0.6 | 2.2 | 3.8 | 9.3 | 12.6 | 6.8 | 64.7 |
| 2 | 136 | 14 | Yes | 0.055 | 0.25 | 0.64 | 6.3 | 21.4 | 15.0 | 17.3 | 16.3 | 9.8 | 14.7 |
| 3 | 125 | 25 | No | 0.1 | 0.45 | 0.65 | 1.0 | 5.8 | 5.5 | 20.1 | 14.5 | 10.2 | 42.8 |
| 4 | 125 | 25 | Yes | 0.1 | 0.45 | 0.65 | Trace | 6.0 | 6.4 | 19.7 | 16.1 | 25.6 | 26.1 |

EXAMPLE 11

Two experiments were preformed as described in the general dispersion procedure described hereinabove, in which Vynathene EY 901 ethylene-vinyl acetate copolymer was dispersed with Dow Polyethylene 459 ethylene-acrylic acid copolymer approximately 65% neutralized in situ during dispersion. The two resins were melt-blended before dispersing. In one experiment, the normal dispersion time was employed, in the other experiment stirring at 3,700 rpm was maintained over an additional hold time of 20 minutes at 200° C. (Table XI).

The longer hold time narrowed the particle size distribution, with 83% of the product particles falling in the range of 149–600 microns. Similar narrowing of particle size distribution with increased hold time was observed when Vynathene EY 901 was dispersed with Surlyn 1555 (Example 16). In neither example, however, were there any significant increase in the finest fraction (<53 microns) at longer hold times.

TABLE XI

POWDERS MADE BY DISPERSING BLENDS OF VYNATHENE EY 901 WITH DOW POLYETHYLENE 459 ETHYLENE-ACRYLIC ACID COPOLYMER 65% NEUTRALIZED IN SITU DURING DISPERSIONS EFFECT OF DISPERSION TIME.

Aqueous Medium 450 ml  
Vynathene EY 901 136 g  
Dow PE 459 14 g  
NaOH/—COOH 0.65  
Dispersion Temp. 200° C.

| Exp. No. | Dispersion Time Min. | Particle Size Distribution in Weight Percent per Particle Size Fraction (Microns) | | | | | | |
|---|---|---|---|---|---|---|---|---|
| | | <53 | 53–106 | 106–149 | 149–250 | 250–420 | 420–600 | >600 |
| 1 | Normal | 5.3 | 21.4 | 15.0 | 17.3 | 16.3 | 9.8 | 14.7 |
| 2 | 20 | 0.3 | 3.1 | 5.0 | 23.4 | 43.4 | 16.3 | 8.4 |

EXAMPLE 12

Two blends of the same polyethylene and Surlyn 1555 used in Example 4 were made on a two-roll mill to provide sufficient starting material for a number of experiments. Surlyn 1555 was blended at 10 (Blend B-1) and 20 (Blend B-2) parts by weight per 100 parts by weight of polyethylene. Two blending was done at 113° C. for a period of 5 minutes. Thereafter the sheeted blends were cut into small pieces suitable for introduction into the dispersion reactor.

In two separate experiments, 150 g of each blend was subjected to dispersion as described in Example 4 in 450 ml of deionized water at 200° C. and 3700 rpm. No dispersion was recovered from Blend B-1 and 90% of the product of Blend B-2 was above 420 microns in particle size. In a third experiment Blend B-2 was stirred at 200° C. for 20 minutes before cooling. Slightly better, but still unacceptable, powder products were recovered. Table XII summarizes the results.

From Table XII it is evident that blends of Surlyn 1555 and polyethylene cannot be dispersed satisfactorily in water at 200° C. after as much as 20 minutes longer hold time. These unexpected results reveal that blending polyethylene with the dispersing resin already in the ionomeric form is not equivalent to introducing the polyethylene and Surlyn 1555 ionomer separately (compare Example 4), a result not predicted from U.S. Pat. No. 4,174,335.

TABLE XII

POWDERS MADE BY DISPERSING BLENDS OF PETROTHENE NA 202 LOW DENSITY POLYETHYLENE AND SURLYN 1555 IN WATER

| | Blend Composition | | Dispersion Time at 200° C., Min. | Particle Size Distribution in Weight Percent per Particle Size Fraction (Microns) | | | | | | |
|---|---|---|---|---|---|---|---|---|---|---|
| No. | Petrothene NA 202 g. | Surlyn 1555 g. | | <53 | 53–106 | 106–149 | 149–250 | 250–420 | 420–600 | >600 |
| B-1 | 136 | 14 | Normal | No Dispersion | | | | | | |
| B-2 | 125 | 25 | Normal | — | — | — | — | — | 90 | — |
| B-2 | 125 | 25 | 20 | — | — | 0.3 | 2.1 | 21.5 | 69.6 | 6.1 |

EXAMPLE 13

Portions of Blends B-1 and B-2 of Example 12 were dispersed as described in Examples 4 and 12 but dilute sodium hydroxide solutions were used as the aqueous medium instead of water. Dispersions were now obtained, with the particle size distributions shown in Table XIII. At each of the two levels of Surlyn 1555 employed, finer particles and narrower particle size distributions were observed for higher initial alkali concentration in the aqueous medium. A similar effect was observed in Example 3 when the degree of neutralization of the ethylene-acrylic acid copolymer was increased, indicating again that initial alkali concentration in the aqueous medium is a parameter providing some control over particle size.

The effect on particle size and particle size distribution of increasing the ionomer/polyethylene ratio was not as evident here in the dispersion of melt-blended resins as it was when the resins were fed separately (Example 4).

Data appear in Table XIV, which includes experiments from Table XIII. Overall, the effect of increased initial alkali concentration and higher ionomer/polyethylene ratio is to favor finer particles and some narrowing of particle size distribution. However, there is no advantage in increasing the hold time in these experiments in which melt blends of ionomer and polyethylene were fed. Contrasting behavior was observed in dispersing ionomer/EVA blends (Example 11).

TABLE XIV
POWDERS MADE BY DISPERSING BLENDS OF PETROTHENE NA 202 POLYETHYLENE AND SURLYN 1555 IN DILUTE AQUEOUS ALKALI MEDIA. EFFECT OF DISPERSION TIME

Aqueous Medium 450 ml
Dispersion Temp. 200° C.

| | Blend Composition | | Aqueous Medium | | | Dispersion | Particle Size Distribution in Weight Percent per Particle Size Fraction (Microns) | | | | | |
|---|---|---|---|---|---|---|---|---|---|---|---|---|
| Exp. No. | Petrothene NA 202, g. | Surlyn 1555, g. | Init. NaOH Conc., % | NaOH, —COOH Molar | Na+, MAA Molar | Time at 200° C. Min. | $<53^1$ | 53–106 | 106–149 | 149–250 | 250–420 | 420–600 |
| 1 | 136 | 14 | 0.055 | 0.64 | 0.79 | Normal | 21.1 | 33.3 | 21.7 | 15.4 | 6.5 | 1.9 |
| 2 | 136 | 14 | 0.055 | 0.64 | 0.79 | 5 | 21.6 | 50.0 | 14.7 | 8.3 | 2.9 | 2.4 |
| 3 | 136 | 14 | 0.055 | 0.64 | 0.79 | 20 | 21.1 | 46.1 | 16.3 | 14.1 | 1.4 | 1.0 |
| 4 | 136 | 14 | 0.11 | 1.29 | 1.18 | Normal | 29.5 | 44.9 | 11.7 | 8.8 | 3.7 | 1.4 |
| 5 | 136 | 14 | 0.11 | 1.29 | 1.18 | 5 | 30.2 | 42.6 | 12.6 | 11.0 | 2.4 | 1.2 |
| 6 | 136 | 14 | 0.11 | 1.29 | 1.18 | 20 | 30.0 | 38.0 | 11.8 | 12.1 | 5.5 | 2.6 |
| 7 | 125 | 25 | 0.055 | 0.36 | 0.61 | Normal | $10.6^2$ | 31.7 | 15.9 | 21.9 | 10.3 | 9.5 |
| 8 | 125 | 25 | 0.055 | 0.36 | 0.61 | 20 | 23.3 | 33.8 | 10.9 | 22.1 | 9.6 | 0.2 |
| 9 | 125 | 25 | 0.22 | 1.44 | 1.26 | Normal | $42.2^3$ | 39.5 | 14.4 | 2.7 | 0.8 | 0.4 |
| 10 | 125 | 25 | 0.22 | 1.44 | 1.26 | 5 | $49.9^4$ | 34.4 | 11.3 | 2.9 | 1.0 | 0.5 |
| 11 | 125 | 25 | 0.22 | 1.44 | 1.26 | 10 | $45.2^3$ | 32.9 | 17.6 | 3.2 | 0.7 | 0.4 |
| 12 | 125 | 25 | 0.22 | 1.44 | 1.26 | 20 | $50.9^5$ | 30.6 | 12.0 | 5.1 | 1.1 | 0.2 |

[1] Microscopic examination showed that each of the total powders was free of particles with a diameter of 10 microns or less, except where noted otherwise; most particles were 20–100 microns in diameter.
[2] Not examined.
[3] At most 6 particles out of 100 had a diameter of 5–10 microns; most particles had a diameter of 20–100 microns (examination on total powder).
[4] Out of 100 particles 4 had diameters of 5–10 microns; most particles had diameters of 20–100 microns (examination on total powder).
[5] 1–2 particles per 100 had diameters of 5–10 microns; most were 20–100 micron particles (examination on total powder).

TABLE XIII
POWDERS MADE BY DISPERSING BLENDS OF PETROTHENE NA 202 AND SURLYN 1555 IN DILUTE AQUEOUS ALKALI MEDIA

Aqueous Medium 450 ml
Dispersion Temp. 200° C.
Dispersion Time Normal

| | Blend | | Aqueous Medium | | | Particle Size Distribution in Weight Percent per Particle Size Fraction (Microns) | | | | | |
|---|---|---|---|---|---|---|---|---|---|---|---|
| Exp. No. | Petrothene NA 202, g. | Surlyn 1555, g. | NaOH Conc., % | NaOH, —COOH Molar | Na+, MAA Molar | $<53$ | 53–106 | 106–149 | 149–250 | 250–420 | >420 |
| 1 | 136 | 14 | 0.055 | 0.64 | 0.79 | $21.1^1$ | 33.3 | 21.7 | 15.4 | 6.5 | 1.9 |
| 2 | 136 | 14 | 0.11 | 1.29 | 1.18 | $29.5^1$ | 44.9 | 11.7 | 8.8 | 3.7 | 1.4 |
| 3 | 125 | 25 | 0.055 | 0.36 | 0.61 | 10.6 | 31.7 | 15.9 | 21.9 | 10.3 | 9.5 |
| 4 | 125 | 25 | 0.11 | 0.72 | 0.83 | $34.9^1$ | 36.1 | 12.2 | 11.9 | 2.6 | 2.2 |
| 5 | 125 | 25 | 0.22 | 1.44 | 1.26 | $42.2^2$ | 39.5 | 14.4 | 2.7 | 0.8 | 0.4 |

[1] Microscopic examination showed that out of 100 particles none was less than 10 microns in diameter (examination made on total powder).
[2] At most 6 particles per 100 had a diameter of 5–10 microns, most were 20–100 micron particles (examination made on total powder).

EXAMPLE 14

Additional dispersion experiments were performed with Blends B-1 and B-2 of Example 12. Conditions of dispersion were similar to those of Example 13 but longer hold times up to 20 minutes at the dispersion temperature (200° C.) were used at two different levels of initial alkali concentration in the aqueous medium.

EXAMPLE 15

In this example a blend of 10 parts by weight of Surlyn 1555 and 100 parts by weight of Vynathene EY 901 ethylene-vinyl acetate copolymer was made on a two-roll mill by milling the two resins together for 5 minutes at 113° C. In three experiments, 150 g portions of the blend were cut into small pieces and charged to the reactor along with 450 ml. of a 0.22 weight percent aqueous solution of sodium hydroxide. Dispersion experiments were performed according to the general dispersion procedure, but three different dispersion temperatures were employed, and a 20-minute hold time was applied at each dispersion temperature before cooling to 100° C. in the normal way. Table XV records the results of the experiments.

Under the conditions of these experiments, increasing the dispersing temperature from 150° C. to 200° C. narrowed the particle size distribution to an intermediate particle size range (149–420 microns).

TABLE XV

Powders Made by Dispersing Blends of Vynathene EY 901 Ethylene-Vinyl Acetate Copolymer and Surlyn 1555 in Dilute Aqueous Alkali Medium. Effect of Dispersion Temperature at a 20 Minute Hold Time

| | |
|---|---|
| Vynathene EY 901 | 136 g |
| Surlyn 1555 | 14 g |
| Aqueous Medium | 450 ml |
| Init. NaOH Conc. | 0.22 wt. % |
| NaOH/—COOH | 2.6 (molar) |
| $Na^+$/MAA | 1.9 (molar) |
| Dispersion Time | 20 min. |

Particle Size Distribution in Weight Percent per Particle Size Fraction (Microns)

| Dispersion Temp. °C. | <53 | 53–106 | 106–149 | 149–250 | 250–420 | 420–600 | >600 |
|---|---|---|---|---|---|---|---|
| 150 | 3.0 | 15.1 | 9.0 | 17.5 | 18.6 | 22.5 | 14.3 |
| 175 | 4.0 | 12.6 | 10.0 | 13.4 | 20.7 | 22.5 | 16.8 |
| 200 | 2.4 | 10.1 | 10.0 | 28.6 | 44.0 | 4.6 | 0.1 |

EXAMPLE 16

As in Example 15, a blend of 10 parts by weight of Surlyn 1555 and 100 parts by weight of Vynathene EY 901, ethylene-vinyl acetate copolymer was dispersed in dilute aqueous alkali media in a series of experiments at 200° C. in which the effect of longer hold times of 5, 10 and 20 minutes was investigated (Table XVI).

Under the conditions of the experiments, the particle size distribution narrows with increasing hold time at the dispersion temperature, but the distribution centers not in the finest particles ranges, but at intermediate particle sizes, i.e., at 149–420 microns. There is no significant increase in the finest particle fraction (<53 microns). Accordingly, the ethylene-vinyl acetate copolymer and low density polyethylene respond differently to increased hold time at dispersion temperature and, at least for ethylene-vinyl acetate copolymers, hold time can be used as a means of exerting control over particle size.

TABLE XVI

Powders Made By Dispersing Blends of Vynathene EY 901 Ethylene-Vinyl Acetate Copolymer and Surlyn 1555 in Dilute Aqueous Alkali Medium. Effect of Dispersion Hold Time at 200° C.

| | |
|---|---|
| Vynathene EY 901 | 136 g |
| Surlyn 1555 | 14 g |
| Aqueous Medium | 450 ml |
| Init. NaOH Conc. | 0.22 wt. % |
| NaOH/—COOH | 2.6 (molar) |
| $Na^+$/MAA | 1.9 (molar) |
| Dispersion Temp. | 200° C. |

Particle Size Distribution in Weight Percent per Particle Size Fraction (Microns)

| Exp. No. | Dispersion Time, min. | <53 | 53–106 | 106–149 | 149–250 | 250–420 | 420–600 | >600 |
|---|---|---|---|---|---|---|---|---|
| 1 | Normal | 1.7 | 10.1 | 6.2 | 14.6 | 19.0 | 20.8 | 27.7 |
| 2 | 5 | 2.2 | 12.5 | 10.1 | 15.2 | 22.6 | 28.9 | 8.5 |
| 3 | 10 | 2.4 | 7.2 | 9.2 | 25.1 | 44.8 | 10.7 | 0.6 |
| 4 | 20 | 3.4 | 10.2 | 15.0 | 40.4 | 29.6 | 0.9 | 0.4 |

EXAMPLE 17

A melt blend of Petrothene LS 630 (250 g) and Surlyn 1555 (13.2 g) was made on a two-roll mill at 135° C. A 150 g portion of the blend (142.5 g Petrothene LS 630 and 7.5 g of Surlyn 1555) was cut into pieces and introduced into the Parr pressure reactor along with 450 ml of water containing 0.17 g of sodium hydroxide. In accordance with the general dispersion procedure, the reactor was heated to 200° C., when stirring at 3700 rpm was started. Cooling of the reactor with dry ice was started at once and the stirring was continued until the temperature reaced 100° C. The product was a coarse dispersion with the following particle size distribution:

| | |
|---|---|
| 53–106 microns, | 2–8% by weight |
| 106–149 microns, | 13.1% by weight |
| 149–250 microns, | 26.2% by weight |
| 250–420 microns, | 33.2% by weight |
| >420 microns, | 24.7% by weight |

The conditions of the above experiment closely resemble those of Example 2, U.S. Pat. No. 4,174,335 in prior melt blending of resins, ratio of thermoplastic resin to dispersing resin, acid number and degree of neutralization of dispersing resin. Linear polyethylene, however, was substituted for ethylene-butene-1 copolymer as thermoplastic resin. But, more importantly, the slow addition rate of the above cited patent was replaced with the rapid resin feed rate of the present invention (Tables A-2, B-2).

The experiment shows that the ultrafine particles of U.S. Pat. No. 4,174,335 are not obtained. Instead, the coarser particles of the process of this invention are recovered.

EXAMPLE 18

Powder products made by dispersing Vynathene EY 901 ethylene-vinyl acetate copolymer with 10 and 20 parts by weight of Surlyn 1555 per 100 parts of the copolymer were milled for 5 minutes at 113° C. in a two-roll rubber mill, and then pressed into test plaques at 140° C. for 3 minutes. Strength properties were determined on these test specimens. In addition, similar compositions were made by mixing the two resins in the same proportions on a two-roll mill, and the strength properties of the mill blends were determined for comparison. Melt flow rates of the various compositions were also measured. Corresponding measurements were made on both the Surlyn 1555 and Vynathene EY 901. Results are tabulated in Table XVIII.

The data in Table XVIII show that the tensile strength of the blends of Vynathene EY 901 and Surlyn 1555 fall in the range of 2,000–2,200 psi when made by the powder process described hereinbefore. Simple mill blends of the same composition exhibit tensile strengths that are somewhat lower, i.e., in the range 1,700–2,000 psi. The tensile strengths of the original Vynathene EY 901 and Surlyn 1555 were determined and a straight line drawn between the two values as reference points (Table XVIII) as a function of blend composition. Tensile values were interpolated along the line corresponding to the powder and mill blend compositions and are set forth in Table XVIII along with the measured tensile strengths. For all blends, the measured tensiles are higher than the interpolated tensiles with those of the powder process blends exceeding the values for the mill blends.

Blend specimens showing the above described elevated tensile strength were tested for gel content. It was found that all such compositions were soluble in the hot tetrahydrofuran containing 5% glacial acetic acid.

exhibit elevated tensile strengths characteristic of thermoplastic elastomers as disclosed hereinabove, were then tested as impact modifiers in rigid polyvinyl chloride as follows:

Each powder was dry-blended with polyvinyl chloride powder (Geon 100 EP-76F, B. F. Goodrich Company) and stabilizers Mark C and Mark 235 (a barium/cadmium type and a phosphite type, respectively, Argus Chemical Corporation) in the amounts shown in Table XIX (Compounds A and B). The two powder blends were milled for 10 minutes at 195±5° C. on a two-roll mill. The milled compounds were thereafter compression molded into 6-inch×6-inch×$\frac{1}{8}$-inch sheets at about 190° C. Test specimens were cut from the sheets and finished on a milling machine to the desired dimensions. Physical properties were then determined on the specimens and are reported in Table XIX. A control compound (Compound C) was made under the same conditions, except that in place of the ionomer-coated ethylene-vinyl acetate copolymers, pellets of the same ethylene-vinyl acetate copolymer were substituted. Table XIX shows that the Izod impact strengths of the test specimens made from Compounds A and B compared well with the Izod impact obtained from the control Compound C. Stiffness properties were somewhat inferior, but this may, in part, reflect the fact that the powders were compared at equal levels of ethylene-vinyl acetate copolymers; i.e., the total amounts of powder was larger by the amount of ionomer resin present.

TABLE XVIII

COMPARISON OF THE PROPERTIES OF COMPOSITIONS MADE ON A TWO ROLL MILL WITH THOSE OF COMPOSITIONS MADE BY POWDER PROCESS

| | | | Compounding Method | | Properties of Product[1] | | | | | |
|---|---|---|---|---|---|---|---|---|---|---|
| | | Surlyn | | | Melt Flow Rate, | Tensile Strength, Break, psi | | | | Gel |
| Exp. No. | Vynathene EY 901 | 1555 pph | Type | Temp., °C. | (Cond. B) g/10 Min. | Inter- polated[2] | Measured[3] | Elong. %[3] | Hardness, Shore A[4] | Content %[5] |
| 1 | Specimen 1 | None | None | — | 1.40 | — | 1,408 | 798 | 67 | — |
| 2 | Specimen 1 | None | Mill 5 minutes | 150 | 1.40 | — | 1,730 | 797 | — | — |
| 3 | Specimen 1 | 10 | Mill 5 minutes | 150 | 1.28 | 1,510 | 1,994 | 887 | 68 | — |
| 4 | Specimen 1 | 20 | Mill 5 minutes | 150 | 1.22 | 1,600 | 1,895 | 873 | 71 | — |
| 5 | Specimen 1 | 20 | Mill 5 minutes | 182 | 1.30 | 1,606 | 1,819 | 882 | 72 | — |
| 6 | Specimen 1 | 10 | Powder Process | 200 | 0.59 | 1,510 | 2,103 | 760 | 73 | zero |
| 7 | Specimen 1 | 20 | Powder Process | 200 | 0.42 | 1,600 | 2,204 | 742 | 79 | zero |
| 8 | Specimen 2 | None | None | — | 1.48 | — | 1,410 | 766 | — | — |
| 9 | Specimen 2 | 10 | Mill 5 minutes | 150 | 1.35 | 1,510 | 1,925 | 854 | — | — |
| 10 | Specimen 2 | 20 | Mill 5 minutes | 150 | 1.26 | 1,600 | 1,700 | 860 | — | — |
| 11 | Specimen 2 | 20 | Mill 5 minutes | 200 | 0.94 | 1,600 | 1,749 | 860 | — | — |
| 12 | Specimen 2 | 10 | Powder Process | 200 | 0.60 | 1,510 | 2,096 | 858 | — | — |
| 13 | Specimen 2 | 20 | Powder Process | 200 | 0.61 | 1,600 | 1,995 | 853 | — | — |
| 14 | Specimen 3 | None | None | — | 0.48 | — | 1,620 | — | — | — |
| 15 | None | 100 | None | — | 0.59 | — | 2,608 | — | — | — |

[1]All products were pressed into test plaques at 140° C. and 500 psi for 3 minutes. To avoid heterogeneity, powder process products were first milled 5 minutes at 113° C.
[2]Interpolation on straight line joining measured ring tensiles of EVA and of Surlyn 1555.
[3]Tensiles were measured on ring test specimens by a procedure similiar to ASTM D-412.
[4]ASTM D-2240
[5]As judged by solubility in a mixture of tetrahydrofuran containing 5% by weight: of glacial acetic acid.

EXAMPLE 19

In this example, Vynathene EY 901 ethylene-vinyl acetate copolymer was dispersed in water in two separate experiments with 10 parts and with 20 parts by weight of Surlyn 1555 as described in Example 8 (Experiments 1 and 2 of Table VIII). Upon recovery, the ionomer polymer-coated powders, compositions which

TABLE XIX

| | Test Method | Compound | | |
|---|---|---|---|---|
| | | A | B | C |
| Geon 103EP-76F | | 100 | 100 | 100 |
| Mark C | | 1 | 1 | 1 |
| Mark 235 | | 3 | 3 | 3 |
| Ethylene-vinyl acetate | | | | |
| Powder with 10 phr Surlyn 1555 | | 8.9 | — | — |
| Powder with 20 phr Surlyn 1555 | | — | 10 | — |
| Pellets | | — | — | 8 |
| Time to Band, sec. | | 120 | 135 | 115 |
| Plate-out | | Very slight | Moderate | Slight |

TABLE XIX-continued

| | Test Method | Compound A | B | C |
|---|---|---|---|---|
| Izod Impact Strength | ASTM D256 | | | |
| Ft-Lbs/inch of notch, Room Temperature | | 18.5 | 17.7 | 18.7 |
| 0° C. | | 2.2 | 2.2 | 3.1 |
| Falling Weight Impact Strength | ASTM D3029 | | | |
| In-lbs/mil, Room Temp. | | 3.71 | 3.81 | 3.74 |
| Heat Distortion Temp. at 264 psi, °C. | ASTM D648 | 68.0 | 67.8 | 67.8 |
| Hardness, Shore D, 15 sec. | ASTM D2240 | 66.9 | 77.5 | 78 |
| Flexural Strength, psi | ASTM D790 | 12,533 | 10,330 | 11,980 |
| Flexural Stiffness, psi | ASTM D790 | 326,766 | 323,984 | 383,937 |

What is claimed is:

1. A dry powder of finely dispersed thermoplastic resin comprising resins selected from homopolymers and copolymers of olefins wherein the individual resin particles are substantially coated uniformly with a substantially water-insoluble ionomer, the ionomer including at least about 50 mol percent of an ethylenically unsaturated alpha-olefin of about 2 to about 10 carbon atoms, from about 0.2 to about 50 mol percent of an alpha, beta ethylenically unsaturated carboxylic acid having from about 3 to about 8 carbon atoms, with at least 10% of the acid groups being neutralized, said individual resin particles having diameters greater than about 10 microns and being present in the form of a finely divided dry powder.

2. The thermoplastic resin of claim 1 wherein the individual particles have diameters less than about 800 microns and greater than about 10 microns.

3. The thermoplastic resin of claim 1 wherein the ionomer polymer is made by salt-forming with metal ions at least 10% of the acid groups of a copolymer of units derived from an alpha-olefin of the formula $RCH=CH_2$ wherein R is H or alkyl having from 1–8 carbon atoms and from 1.0 to 25 mole percent of units derived from an alpha, beta-ethylenically unsaturated carboxylic acid selected from the group consisting of alpha, beta-ethylenically unsaturated carboxylic acids consisting of acrylic acid, methacrylic acid, maleic acid and, fumaric acid.

4. The thermoplastic resin of claim 3 wherein said alpha-olefin is ethylene.

5. The thermoplastic resin of claim 3 wherein said alpha, beta-ethylenically unsaturated carboxylic acid is methacrylic acid.

6. The thermoplastic resin of claim 1 wherein the homopolymer is selected from the group consisting of polyethylene, polypropylene, polybutene, polyisobutylene and poly(4-methylpentene).

7. The thermoplastic resin of claim 6 wherein the homopolymer is polyethylene or polypropylene.

8. The thermoplastic resin of claim 1 wherein the copolymer is selected from the group consisting of ethylene-vinyl acetate, ethylene-vinyl propionate, ethylene-vinyl isobutyrate, ethylene-vinyl alcohol, ethylene-methyl acrylate, and ethylene-ethyl methacrylate.

9. The thermoplastic resin of claim 8 wherein the copolymer is ethylene-vinyl acetate.

10. The thermoplastic resin of claim 9 wherein said ethylene-vinyl acetate copolymer comprises between about 25 to 50 weight percent of said copolymer of ethylene.

11. Impact modifier powders suitable for dry blending into rigid polyvinyl chloride powder formulations in accordance with claim 1 wherein said modifier powders comprise from about ten to about twenty parts by weight of ionomer resin per one hundred parts by weight ethylene-vinyl acetate copolymer.

12. The thermoplastic resin of claim 11 wherein the ionomer polymer is made by salt forming with metal ions at least 10% of the acid groups of a copolymer of units derived from an alpha-olefin of the formula $RCH=CH_2$ wherein R is H or alkyl having from 1–8 carbon atoms and from 1.0 to 25 mole percent of units derived from an alpha, beta-ethylenically unsaturated carboxylic acid selected from the group consisting of alpha, beta-ethylenically unsaturated carboxylic acids consisting of acrylic acid, methacrylic acid, maleic acid and, fumaric acid.

13. The thermoplastic resin of claim 12 wherein said alpha-olefin is ethylene.

14. The thermoplastic resin of claim 12 wherein said alpha, beta-ethylenically unsaturated carboxylic acid is methacrylic acid.

15. The thermoplastic resin of claim 1 wherein the copolymer is selected from the group consisting of olefin-allyl copolymers.

16. The thermoplastic resin of claim 15 wherein said olefin-allyl copolymer is selected from the group consisting of ethylene-allyl alcohol, ethylene-allyl acetate, ethylene-allyl ether and ethylene-acrolein.

* * * * *